United States Patent
Heneveld, Jr. et al.

(10) Patent No.: US 10,864,128 B2
(45) Date of Patent: Dec. 15, 2020

(54) PATIENT SUPPORT SYSTEMS WITH ROTARY ACTUATORS HAVING CYCLOIDAL DRIVES

(71) Applicant: Stryker Corporation, Kalamazoo, MI (US)

(72) Inventors: William Ross Heneveld, Jr., Portage, MI (US); Christopher Gentile, Sturgis, MI (US); Ross Timothy Lucas, Paw Paw, MI (US)

(73) Assignee: Stryker Corporation, Kalamazoo, MI (US)

( * ) Notice: Subject to any disclaimer, the term of this patent is extended or adjusted under 35 U.S.C. 154(b) by 388 days.

(21) Appl. No.: 15/635,826

(22) Filed: Jun. 28, 2017

(65) Prior Publication Data

US 2018/0000675 A1 Jan. 4, 2018

Related U.S. Application Data

(60) Provisional application No. 62/356,364, filed on Jun. 29, 2016.

(51) Int. Cl.
*A61G 7/018* (2006.01)
*A61G 7/005* (2006.01)
(Continued)

(52) U.S. Cl.
CPC .............. *A61G 7/018* (2013.01); *A61G 7/005* (2013.01); *A61G 7/012* (2013.01); *A61G 7/05* (2013.01);
(Continued)

(58) Field of Classification Search
CPC ........ A61G 7/018; A61G 7/005; A61G 7/012; A61G 7/0516; A61G 7/0514; F16H 1/32; F16H 21/44; F16H 2001/325
See application file for complete search history.

(56) References Cited

U.S. PATENT DOCUMENTS 1,629,277 A 5/1927 Koeb
2,271,201 A 1/1942 Otto
(Continued)

FOREIGN PATENT DOCUMENTS

CN 205859053 U 1/2017
FR 2714135 A1 6/1995
(Continued)

OTHER PUBLICATIONS

English language abstract and machine-assisted English translation for CN205859053 extracted from espacenet.com database on Jul. 26, 2018, 12 pages.
(Continued)

*Primary Examiner* — Robert G Santos
*Assistant Examiner* — Alexis Felix Lopez
(74) *Attorney, Agent, or Firm* — Howard & Howard Attorneys PLLC

(57) ABSTRACT

A patient support system comprises a patient support apparatus for patients. The patient support apparatus comprises a support structure and a patient support surface supported by the support structure. The patient support apparatus also comprises movable members. One or more rotary actuators are coupled to the movable members. The rotary actuator comprises a gear assembly with a cycloidal drive arranged to drive movement of the movable member. The gear assembly also restricts back drive torque from backdriving the movable member.

20 Claims, 18 Drawing Sheets

(51) Int. Cl.
*A61G 7/012* (2006.01)
*A61G 7/05* (2006.01)
*F16H 1/32* (2006.01)
*A61G 7/015* (2006.01)
*F16H 19/04* (2006.01)
*F16H 21/44* (2006.01)

(52) U.S. Cl.
CPC .......... *A61G 7/0513* (2016.11); *A61G 7/0516* (2016.11); *A61G 7/0524* (2016.11); *F16H 1/32* (2013.01); *A61G 7/015* (2013.01); *A61G 7/0506* (2013.01); *A61G 7/0514* (2016.11); *F16H 19/04* (2013.01); *F16H 21/44* (2013.01); *F16H 2001/325* (2013.01)

(56) References Cited

U.S. PATENT DOCUMENTS

| | | | |
|---|---|---|---|
| 2,481,477 A | 9/1949 | Perry | |
| 2,504,737 A | 4/1950 | Shames | |
| 2,605,481 A | 8/1952 | Burkhart | |
| 2,913,300 A | 11/1959 | Darnell et al. | |
| 2,947,364 A | 8/1960 | Haworth | |
| 3,129,607 A | 4/1964 | Schaefer | |
| 3,198,891 A | 8/1965 | Burst et al. | |
| 3,278,952 A | 10/1966 | Holm | |
| 3,307,663 A | 3/1967 | Luenberger | |
| 3,532,882 A | 10/1970 | Craig | |
| 3,558,944 A | 1/1971 | Verge | |
| 3,583,248 A | 6/1971 | Langenberg | |
| 3,627,377 A | 12/1971 | Pickles | |
| 3,921,264 A | 11/1975 | Madonian et al. | |
| 3,972,081 A | 8/1976 | Stern et al. | |
| 4,047,842 A | 9/1977 | Avena et al. | |
| 4,062,075 A | 12/1977 | Stern et al. | |
| 4,271,726 A * | 6/1981 | Ryffel | F16H 1/32 |
| | | | 418/61.3 |
| 4,398,313 A | 8/1983 | Mitchell | |
| 4,425,673 A | 1/1984 | Werner | |
| 4,472,845 A | 9/1984 | Chivetta et al. | |
| 4,472,846 A | 9/1984 | Volk, Jr. et al. | |
| 4,480,733 A | 11/1984 | Grimm et al. | |
| 4,499,618 A | 2/1985 | Werner | |
| 4,747,212 A | 5/1988 | Cavdek | |
| 4,890,979 A | 1/1990 | Ames et al. | |
| 4,914,330 A | 4/1990 | Pierrat | |
| 5,102,377 A | 4/1992 | Spanski | |
| 5,269,031 A | 12/1993 | Alexander | |
| 5,355,743 A | 10/1994 | Tesar | |
| 5,482,305 A | 1/1996 | Jeffries et al. | |
| 5,518,466 A | 5/1996 | Tiedeman | |
| 6,024,664 A | 2/2000 | Shaffner | |
| 6,231,012 B1 | 5/2001 | Cacciola et al. | |
| 6,510,852 B1 | 1/2003 | Shiery et al. | |
| 6,631,797 B2 | 10/2003 | Capewell | |
| 6,739,004 B1 * | 5/2004 | Abrahamsen | A47C 20/041 |
| | | | 5/610 |
| 6,805,371 B2 | 10/2004 | Meginniss, III et al. | |
| 7,802,331 B2 * | 9/2010 | Brown | A47C 19/045 |
| | | | 5/610 |
| 8,056,981 B2 | 11/2011 | Kojima et al. | |
| 8,308,599 B2 | 11/2012 | Akami | |
| 8,312,579 B2 | 11/2012 | Bock | |
| 8,981,271 B1 * | 3/2015 | Risner | F24S 23/77 |
| | | | 250/203.4 |
| 10,011,190 B2 | 7/2018 | Markel et al. | |
| 10,124,874 B1 | 11/2018 | Jaeger et al. | |
| 2002/0089223 A1 | 7/2002 | Yu | |
| 2005/0160856 A1 | 7/2005 | Sugitani | |
| 2006/0247089 A1 | 11/2006 | Guo et al. | |
| 2007/0174965 A1 | 8/2007 | Lemire et al. | |
| 2008/0045374 A1 | 2/2008 | Weinberg et al. | |
| 2009/0062053 A1 | 3/2009 | Kobayashi | |
| 2009/0166995 A1 | 7/2009 | Sorquist | |
| 2010/0004087 A1 | 1/2010 | Minegishi et al. | |
| 2011/0092332 A1 * | 4/2011 | Evenson | F16H 1/003 |
| | | | 475/168 |
| 2011/0113556 A1 | 5/2011 | Roussy et al. | |
| 2011/0241306 A1 | 10/2011 | Serkh et al. | |
| 2011/0319217 A1 * | 12/2011 | Imase | F16H 1/32 |
| | | | 475/168 |
| 2012/0060276 A1 | 3/2012 | Heidlage et al. | |
| 2014/0053333 A1 | 2/2014 | Krieg et al. | |
| 2014/0155215 A1 | 6/2014 | Rademakers | |
| 2014/0283648 A1 | 9/2014 | Severinsson | |
| 2014/0371028 A1 | 12/2014 | Billmeyer | |
| 2015/0283924 A1 | 10/2015 | Boutouil et al. | |
| 2016/0053858 A1 | 2/2016 | Brassitos et al. | |
| 2016/0070247 A1 | 3/2016 | Ohishi et al. | |
| 2016/0076624 A1 | 3/2016 | Uchihara et al. | |
| 2016/0106615 A1 | 4/2016 | Lee et al. | |
| 2016/0156248 A1 | 6/2016 | Lueker | |
| 2016/0169327 A1 | 6/2016 | Fujita et al. | |
| 2016/0290440 A1 | 10/2016 | Chhour | |
| 2016/0302985 A1 | 10/2016 | Tessmer et al. | |
| 2016/0348759 A1 | 12/2016 | McCloy | |
| 2017/0059002 A1 | 3/2017 | Sasaki | |
| 2017/0335944 A1 | 11/2017 | Nishimura | |
| 2018/0000670 A1 | 1/2018 | Bartley et al. | |
| 2018/0000672 A1 | 1/2018 | Heneveld, Jr. et al. | |
| 2018/0000673 A1 | 1/2018 | Bartley | |
| 2018/0000674 A1 | 1/2018 | Bartley | |
| 2018/0000675 A1 | 1/2018 | Heneveld, Jr. et al. | |
| 2020/0008991 A1 | 1/2020 | Wu | |

FOREIGN PATENT DOCUMENTS

| | | |
|---|---|---|
| JP | 2003180762 A | 7/2003 |
| JP | 2017041210 A | 2/2017 |
| JP | 2017137888 A | 8/2017 |
| WO | 0117399 A1 | 3/2001 |
| WO | 0117400 A1 | 3/2001 |
| WO | 2009019846 A1 | 2/2009 |

OTHER PUBLICATIONS

English language abstract and machine-assisted English translation for FR 2 714 135 extracted from espacenet.com database on Jul. 26, 2018, 7 pages.

English language abstract and machine-assisted English translation for JP 2017-041210 extracted from PAJ database on Jul. 26, 2018, 54 pages.

English language abstract and machine-assisted English translation for JP 2017-137888 extracted from espacenet.com database on Jul. 26, 2018, 26 pages.

Crouzet Motors, "Crouzet Webpage", downloaded from http://motors.crouzet.com on Jul. 25, 2018, 3 pages.

Crouzet Motors, "80 W Motomate Planetary Gearboxes Part Number Made to Order Brochure", www.crouzet.com, Feb. 11, 2015, 4 pages.

Crouzet Motors, "Motors and Gearmotors Panorama Brochure", Jul. 2016, 5 pages.

Lin, Wang-Sung et al., "Design of a Two-Stage Cycloidal Gear Reducer with Tooth Modifications", Mechanism and Machine Theory, vol. 79, 2014, pp. 184-197.

Motion Solutions—RM Hoffman Division, "Nabtesco Motion Conrol Solutions—Cycloidal Gear Reducers Webpage", http://www.rmhoffman.com/nabtesco-motion-control.html, 2018, 4 pages.

Nabtesco, "High Performance Reduction Gears & Servo Actuators Brochure", 2018, 12 Pages.

Onvio LLC, "Zero Backlash Speed Reducers Brochure", 2005, pp. 1-19.

YouTube, Renold Sprag Latch, published May 28, 2012; URL: https://www.youtube.com/watch?v=Fsp3fm4KHs0.

GMN Bearing USA, Functionality of the Sprag Clutch Design, available as least as early as Jun. 23, 2016; URL: https://www.gmnbt.com/sprag-clutch-design.htm.

Youtube, Renold Trapped Roller Clutch, published May 28, 2012; URL: https://www.youtube.com/watch?v=QjR7dimpSJA.

(56) References Cited

OTHER PUBLICATIONS

Moog, Aircraft Mechanical Actuators, available at least as early as Feb. 3, 2016; URL: http://www.moog.com/products/actuators-servoactuators/actuation-technologies/mechanical/aircraft-mechanical-actuators/.

YouTube, Hypocycloid Reducer, 100:1, Internal View, published Apr. 23, 2009; URL: https://www.youtube.com/watch?v=SH46bpe1cNA.

English language abstract and machine-assisted translation for JP2003180762 extracted from espacenet.com on Feb. 20, 2018; 9 pages.

"Power Transmission Fundamentals Terminology", downloaded from https://www.chainanddrives.com.au/media/meg/media/file/Power_Transmission_Fundamentals.pdf on Jan. 9, 2020, 33 pages.

English language abstract and machine-assisted English translation of Equivalent JP 2009-036365 for WO 2009/019846 extracted from espacenet.com database on May 7, 2020, 13 pages.

\* cited by examiner

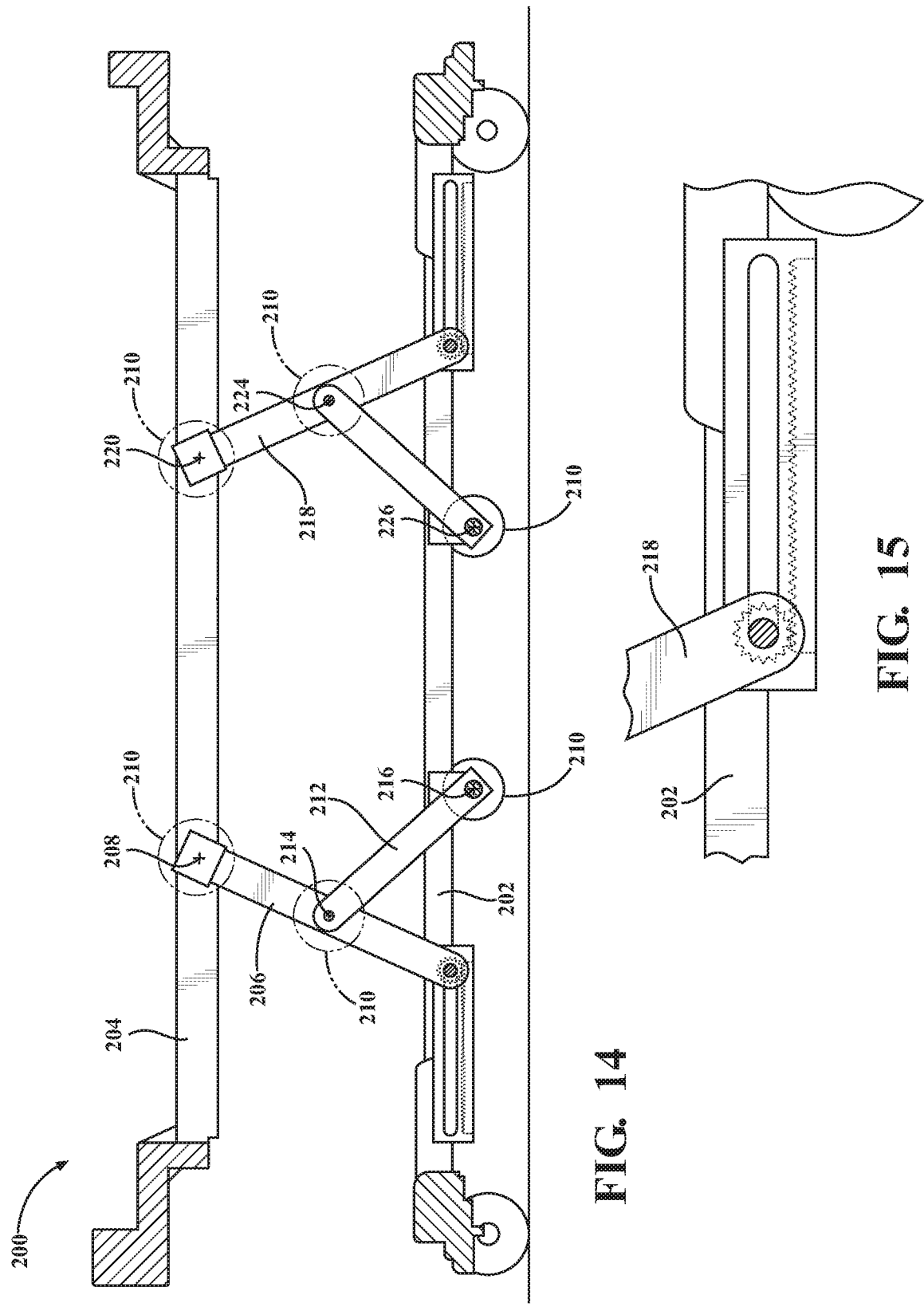

PATIENT SUPPORT SYSTEMS WITH ROTARY ACTUATORS HAVING CYCLOIDAL DRIVES

RELATED APPLICATIONS

This application claims the benefit of and priority to U.S. Provisional Patent Application No. 62/356,364, filed on Jun. 29, 2016, the entire contents and disclosure of which are hereby incorporated by reference herein in their entirety.

BACKGROUND

Patient support systems facilitate care of patients in a health care setting. Patient support systems comprise patient support apparatuses such as, for example, hospital beds, stretchers, cots, and wheelchairs. Conventional patient support apparatuses comprise a base and a patient support surface upon which the patient is supported. Often, these patient support apparatuses also have movable members such as lift members, patient support deck sections, a bed length extension member, a bed width extension member, a wheel, a side rail, a footboard, or a headboard. One or more of these movable members may be moved using actuators. Typically, in order to move these movable members, linear actuators are used. Linear actuators take up a large and undesirable amount of space within the patient support apparatus. Rotary actuators may also be used to move the movable members. Rotary actuators often encounter difficulty preventing movable members from back driving and going into undesirable positions in certain situations, such as during a loss of power or when components break. Additionally, rotary actuators generally lack stiffness to give a caregiver or patient confidence in the structural integrity of the rotary actuator.

A patient support apparatus designed to overcome one or more of the aforementioned challenges is desired.

BRIEF DESCRIPTION OF THE DRAWINGS

FIG. 14 is an elevational view illustrating various locations the actuator may be coupled.

FIG. 15 is an elevational view illustrating a lift arm slidably coupled to a base of a patient support apparatus.

DETAILED DESCRIPTION

Figure 1:
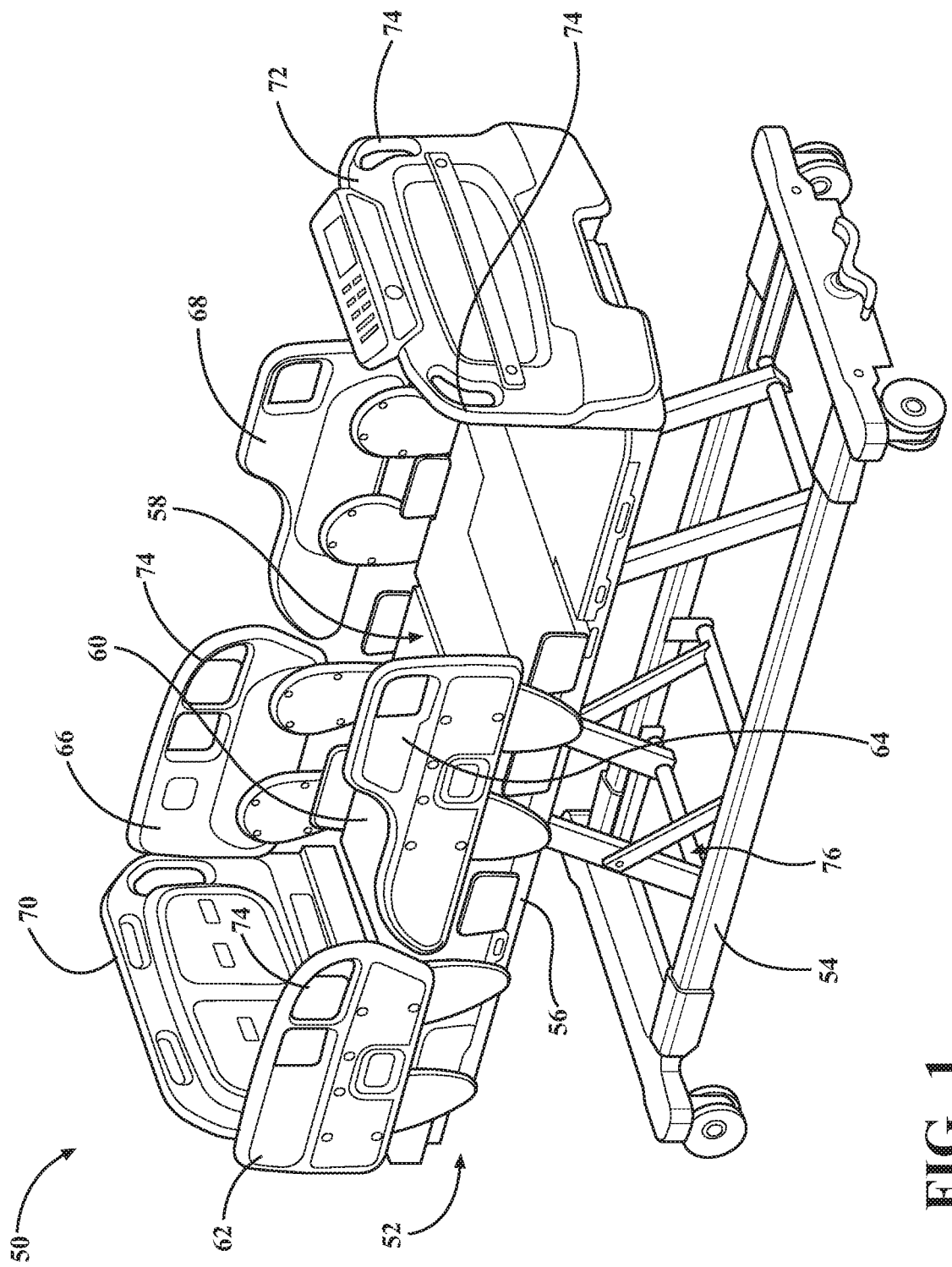
FIG. 1 is a perspective view of a patient support apparatus.

Referring to FIG. 1, a patient support system comprising a patient support apparatus 50 is shown for supporting a patient in a health care setting. The patient support apparatus 50 illustrated in FIG. 1 comprises a hospital bed. In other embodiments, however, the patient support apparatus 50 may comprise a stretcher, cot, table, wheelchair, or similar apparatus utilized in the care of a patient.

A support structure 52 provides support for the patient. The support structure 52 illustrated in FIG. 1 comprises a base 54 and an intermediate frame 56. The intermediate frame 56 is spaced above the base 54. The support structure 52 also comprises a patient support deck 58 disposed on the intermediate frame 56. The patient support deck 58 comprises several sections, some of which are pivotable relative to the intermediate frame 56, such as a fowler section, a seat section, a thigh section, and a foot section. The patient support deck 58 provides a patient support surface 60 upon which the patient is supported.

A mattress (not shown) is disposed on the patient support deck 58. The mattress comprises a secondary patient support surface upon which the patient is supported. The base 54, intermediate frame 56, patient support deck 58, and patient support surfaces 60 each have a head end and a foot end corresponding to designated placement of the patient's head and feet on the patient support apparatus 50. The construction of the support structure 52 may take on any known or conventional design, and is not limited to that specifically set forth above. In addition, the mattress may be omitted in certain embodiments, such that the patient rests directly on the patient support surface 60.

Side rails 62, 64, 66, 68 are coupled to the intermediate frame 56 and thereby supported by the base 54. A first side rail 62 is positioned at a right head end of the intermediate frame 56. A second side rail 64 is positioned at a right foot end of the intermediate frame 56. A third side rail 66 is positioned at a left head end of the intermediate frame 56. A fourth side rail 68 is positioned at a left foot end of the intermediate frame 56. If the patient support apparatus 50 is a stretcher or a cot, there may be fewer side rails. The side rails 62, 64, 66, 68 are movable between a raised position in which they block ingress and egress into and out of the patient support apparatus 50, a lowered position in which they are not an obstacle to such ingress and egress, and/or one or more intermediate positions therebetween. In still other configurations, the patient support apparatus 50 may not include any side rails.

A headboard 70 and a footboard 72 are coupled to the intermediate frame 56. In other embodiments, when the headboard 70 and footboard 72 are included, the headboard 70 and footboard 72 may be coupled to other locations on the patient support apparatus 50, such as the base 54. In still other embodiments, the patient support apparatus 50 does not include the headboard 70 and/or the footboard 72.

Caregiver interfaces 74, such as handles, are shown integrated into the footboard 72 and side rails 62, 64, 66, 68 to facilitate movement of the patient support apparatus 50 over floor surfaces. Additional caregiver interfaces 74 may be integrated into the headboard 70 and/or other components of the patient support apparatus 50. The caregiver interfaces 74 are graspable by the caregiver to manipulate the patient support apparatus 50 for movement. In other embodiments, the patient support apparatus 50 does not include caregiver interfaces 74.

The patient support apparatus 50 may have numerous devices that comprise one or more movable members to perform a desired function. One such device is a lift device 76 that is coupled to the base 54 and the intermediate frame 56 to lift and lower the patient between minimum and maximum heights of the patient support apparatus 50, and/or intermediate positions therebetween. In the embodiment shown, the lift device 76 comprises a movable member in the form of a lift member for effectuating height changes of the patient support apparatus 50. Additionally, the patient support apparatus 50 may have other devices that comprise one or more movable members to perform a desired function such as a deck adjustment device configured to raise and/or lower one or more of the patient support deck sections. The movable members in these devices may be movable relative to another fixed or stationary member of the patient support apparatus 50 or movable relative to another member that also is movable. In some cases, the base 54 and/or the intermediate frame 56 may comprise the movable members. In these devices, one or more actuators 78 (see FIG. 2) are supported by the support structure 52. The actuators 78 are coupled to one or more of the movable members supported by the support structure 52. The movable member is any member supported by the support structure 52 and movable relative to any other member on the patient support apparatus 50, wherein the other member can include stationary or fixed members, or movable members.

Figure 2:
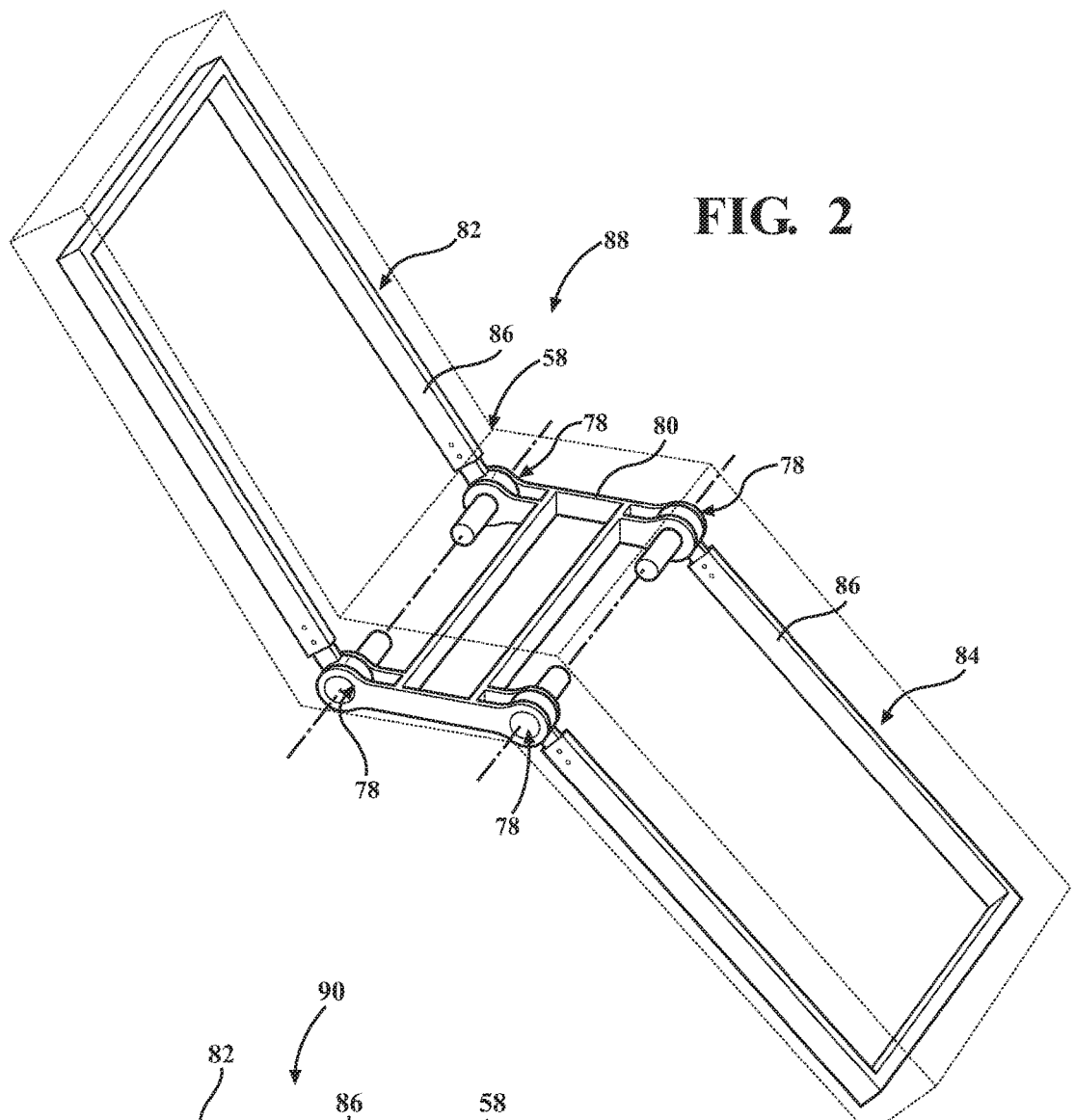
FIG. 2 is a perspective view of a patient support deck in a first position.
Figure 3:
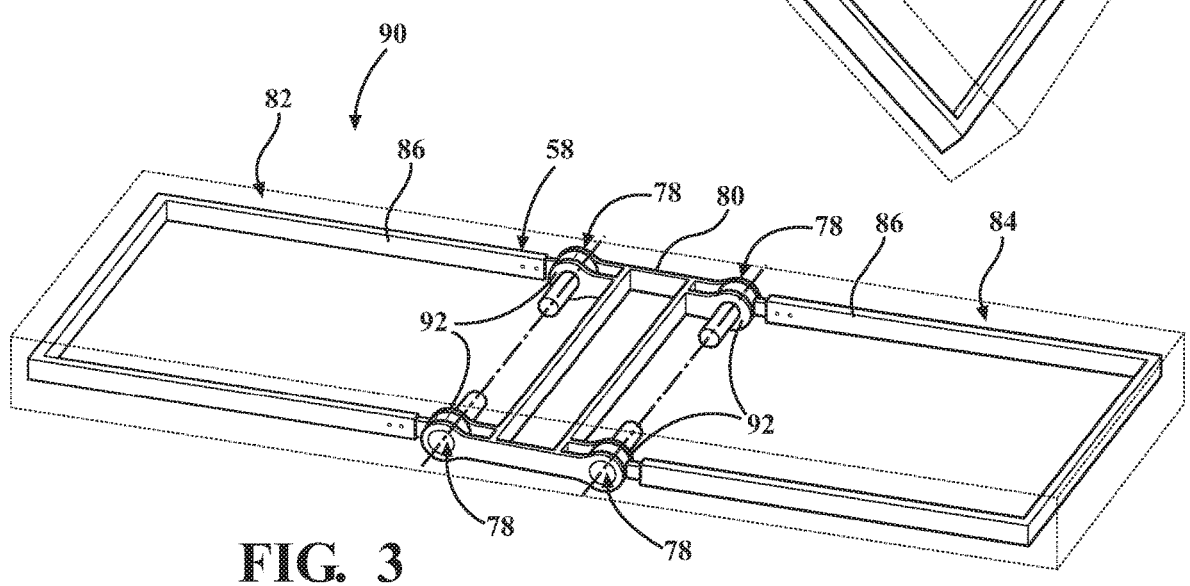
FIG. 3 is a perspective view of the patient support deck in a second position.

Although many different placements and uses of the actuators 78 are possible on a single patient support apparatus 50, only certain illustrative embodiments will be described in detail. Referring to FIGS. 2 and 3, in one embodiment, the patient support deck 58 comprises a seat section 80 supported by the support structure 52. The patient support deck 58 further comprises a fowler section 82 movably coupled to the seat section 80 and a foot section 84 movably coupled to the seat section 80, independent of the fowler section 82. In some embodiments, the seat section 80 is fixed to the intermediate frame 56. Actuators 78 are disposed between the fowler section 82 and the seat section 80 and between the foot section 84 and the seat section 80. The actuators 78 are configured to move the fowler section 82 and the foot section 84 relative to the seat section 80 and the intermediate frame 56. In this embodiment, the fowler section 82 and the foot section 84 comprise movable members 86 movable between at least a first position 88 shown in FIG. 2, a second position 90 shown in FIG. 3, and other positions therebetween. The fowler section 82 and foot section 84 may move concurrently or independently of each other. Four actuators 78 are shown, one for each movable member 86, but one actuator 78 could be employed to move a pair of the movable members 86, such that only one actuator 78 is employed to move each of the fowler section 82 and the foot section 84.

Figure 4:
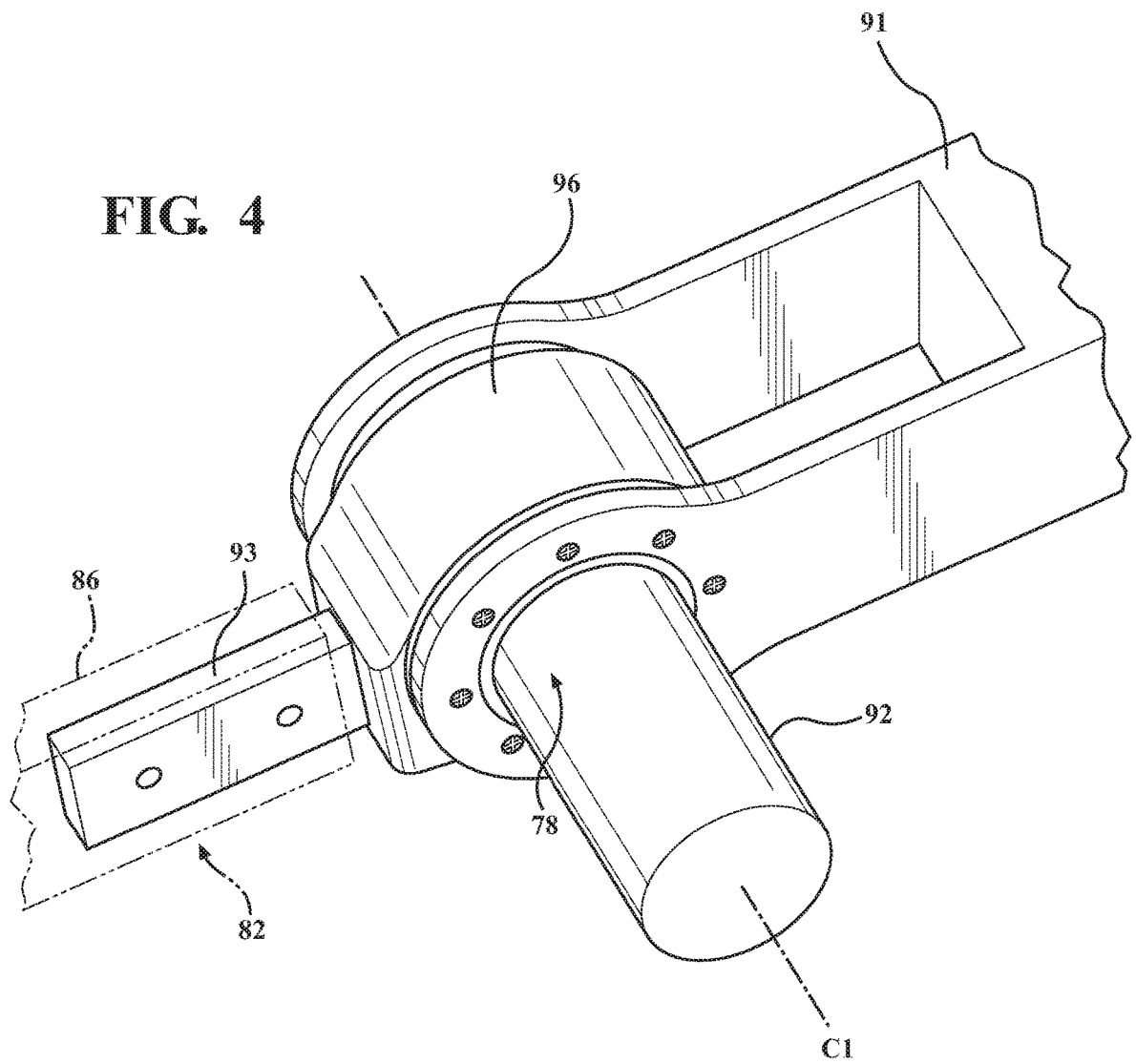
FIG. 4 is a perspective view of an actuator coupled to a seat section and a fowler section of the patient support deck, the actuator being operative to move the fowler section relative to the seat section.

Referring to FIG. 4, only one of the actuators 78 between the fowler section 82 and the seat section 80 is described herein for ease of description. In many of the embodiments disclosed below, the movable member 86 of the fowler section 82 is described for convenience. The movable member 86 is coupled to the actuator 78. The actuator 78 comprises a motor 92. The motor 92 provides power for the actuator 78. The motor 92 may be an electric motor, a hydraulic motor, or any other motor adapted to provide power for the actuator 78. The actuator 78 shown in FIG. 4 is arranged to pivot the fowler section 82 relative to the seat section 80 about center axis C1. FIG. 4 shows a bracket 91 of the seat section 80. The actuator 78 is shown mounted to the bracket 91 via fasteners. The movable member 86 is shown in phantom mounted to an arm 93 of the actuator 78. The arm 93 articulates relative to the bracket 91 to move the fowler section 82 relative to the seat section 80.

Figure 5:
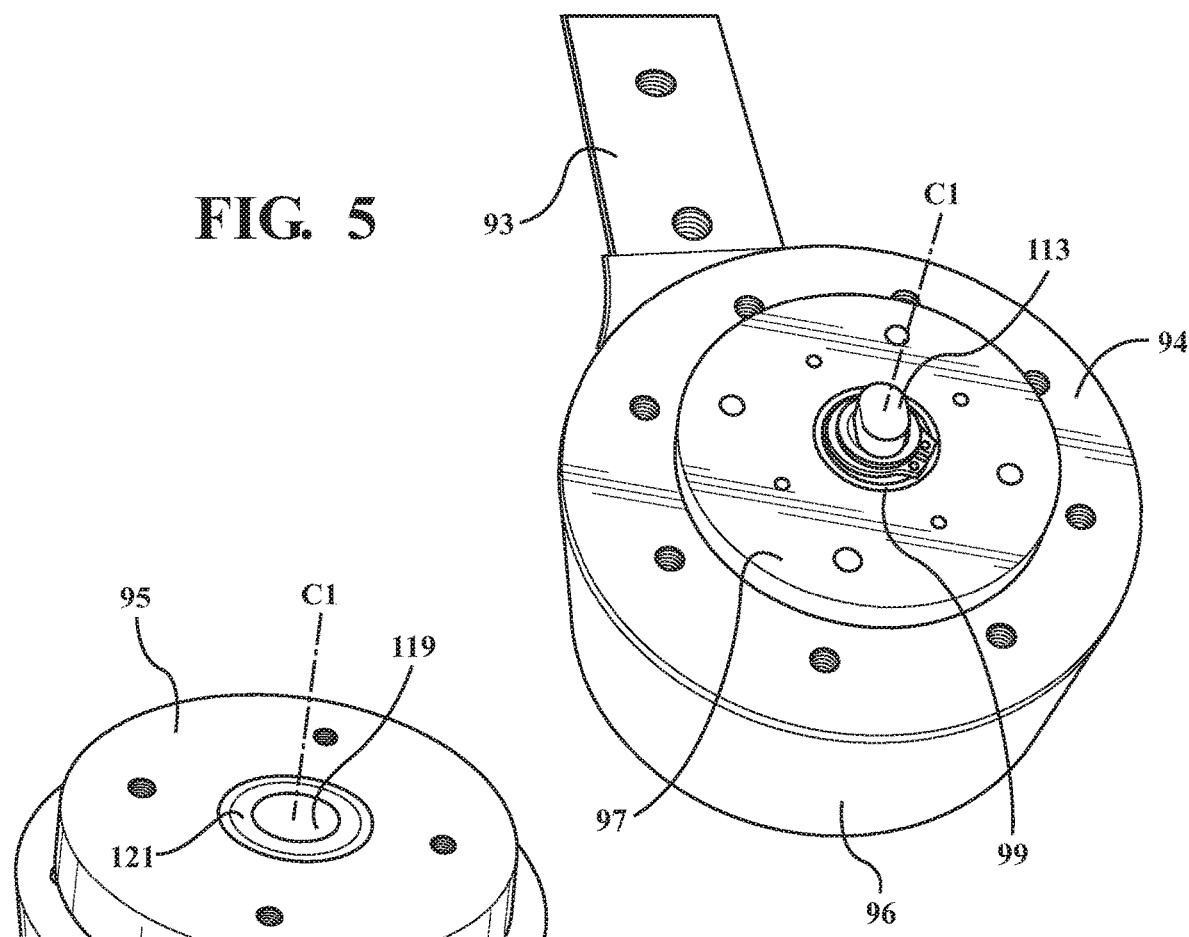
FIG. 5 is a perspective view of a gear assembly of the actuator.
Figure 6:
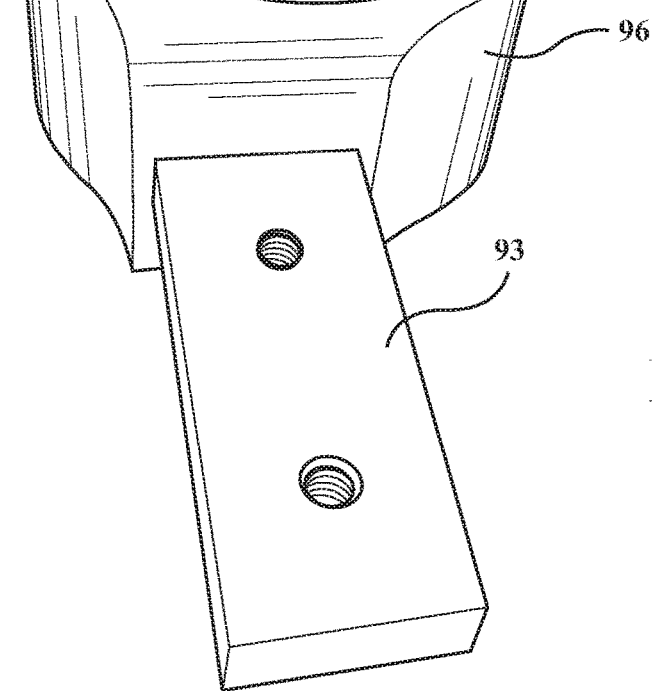
FIG. 6 is another perspective view of the gear assembly of the actuator.

Referring to FIGS. 5 and 6, respectively, opposing sides of the actuator 78 that are attachable to the bracket 91 are shown, including threaded bores into which the fasteners are engaged to mount the sides of the actuator 78 to the bracket 91. More specifically, the actuator 78 comprises a pair of opposing end plates, namely first and second end plates 94, 95, in which the threaded bores are defined. The first and second end plates 94, 95 define a carrier to be fixed to the bracket 91 to support the moving components of the actuator 78. An articulating hub 96 is located between the end plates 94, 95 for rotation relative to the end plates 94, 95. The arm 93 is fixed to and extends from the articulating hub 96. In some embodiments, the arm 93 is a separate component mounted to the hub 96 or may be integrally formed with the hub 96. A motor interface plate 97 is also shown fixed to the first end plate 94. The motor 92 is configured to be mounted to the first end plate 94 via the motor interface plate 97. It should be appreciated that other configurations and methods of mounting the actuators 78 are possible. Further, it should be appreciated that the actuators 78 may be mounted on components that are normally stationary, on the movable members, or on other components.

Figure 7:
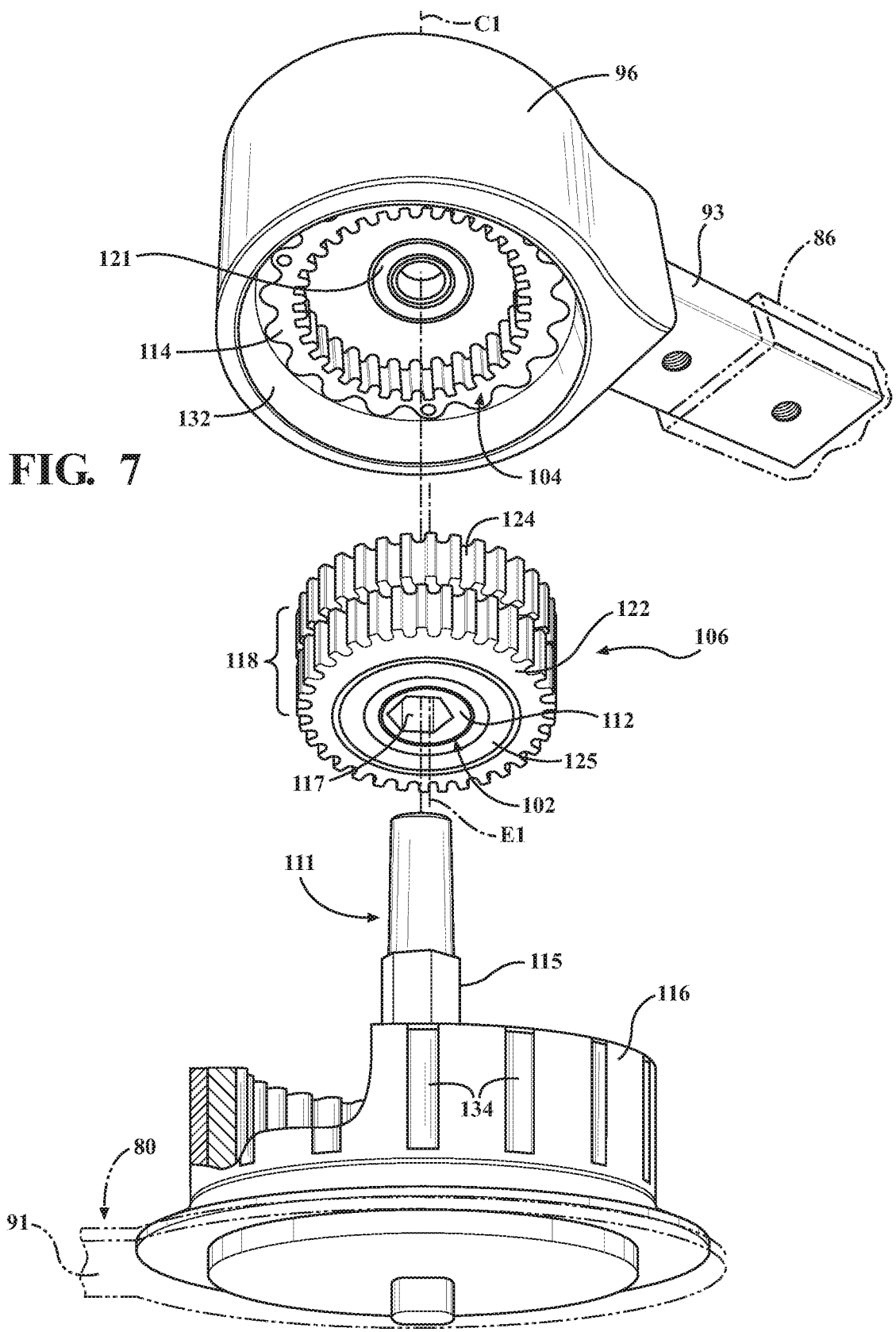
FIG. 7 is a partially exploded view showing a gear arrangement of the gear assembly comprising fixed and moving ring gears and first and second cycloidal gears of a cycloidal drive.
Figure 8:
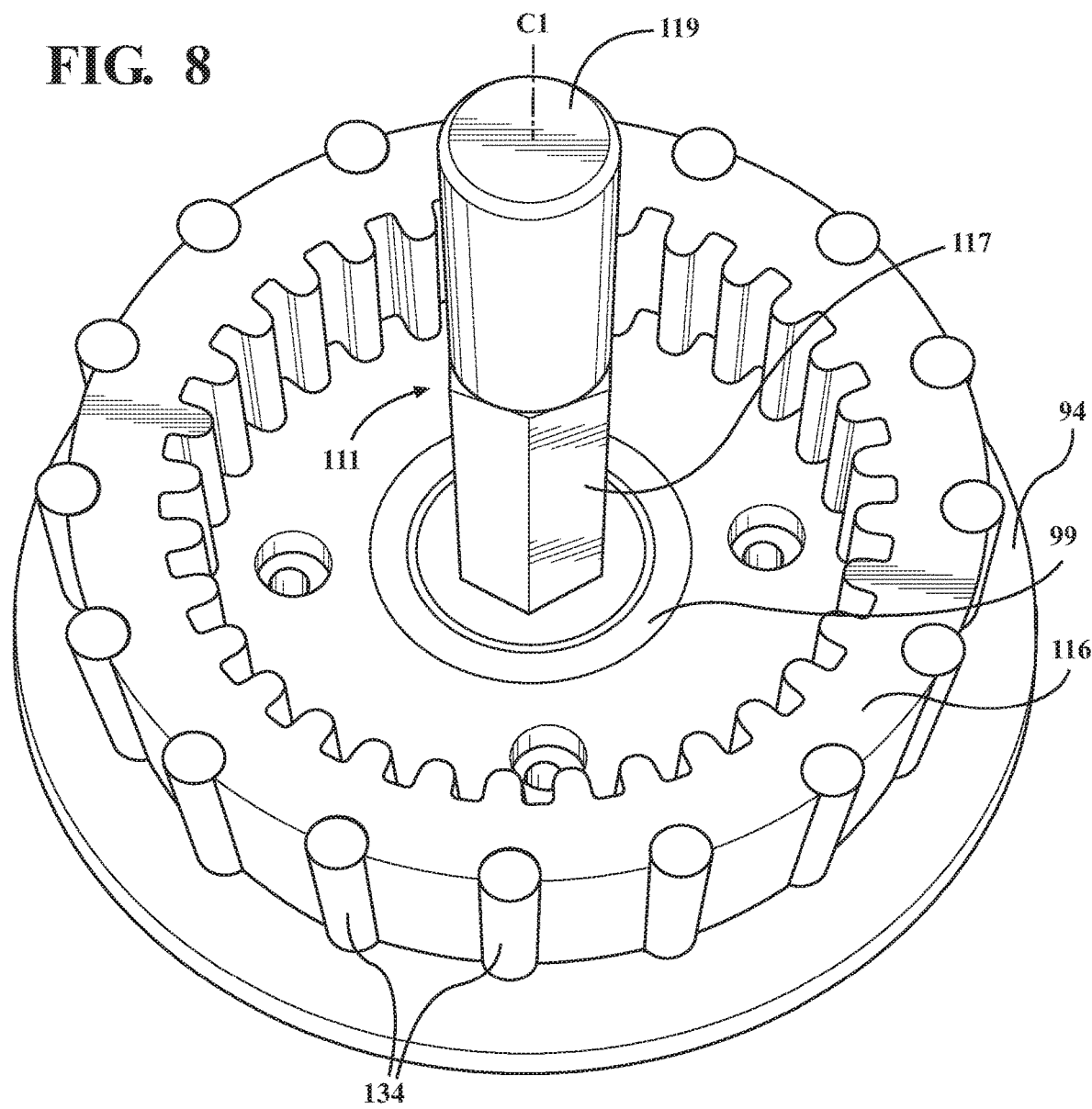
FIG. 8 is an inside perspective view of the fixed ring gear.
Figure 10:
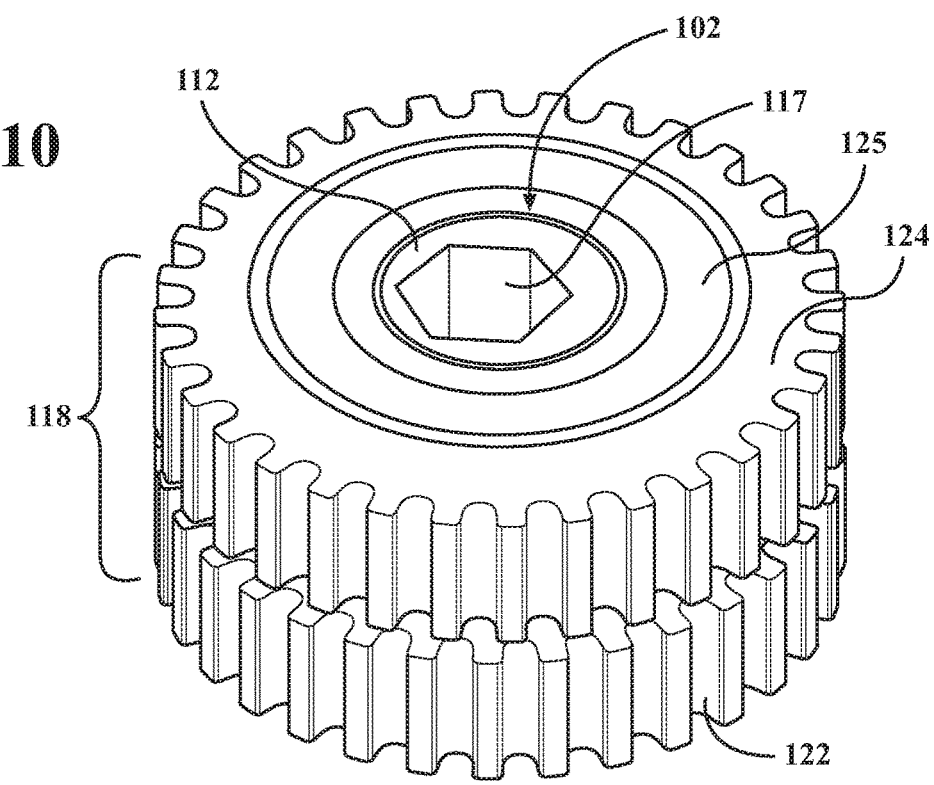
FIG. 10 is a perspective view of the first and second cycloidal gears.
Figure 9:
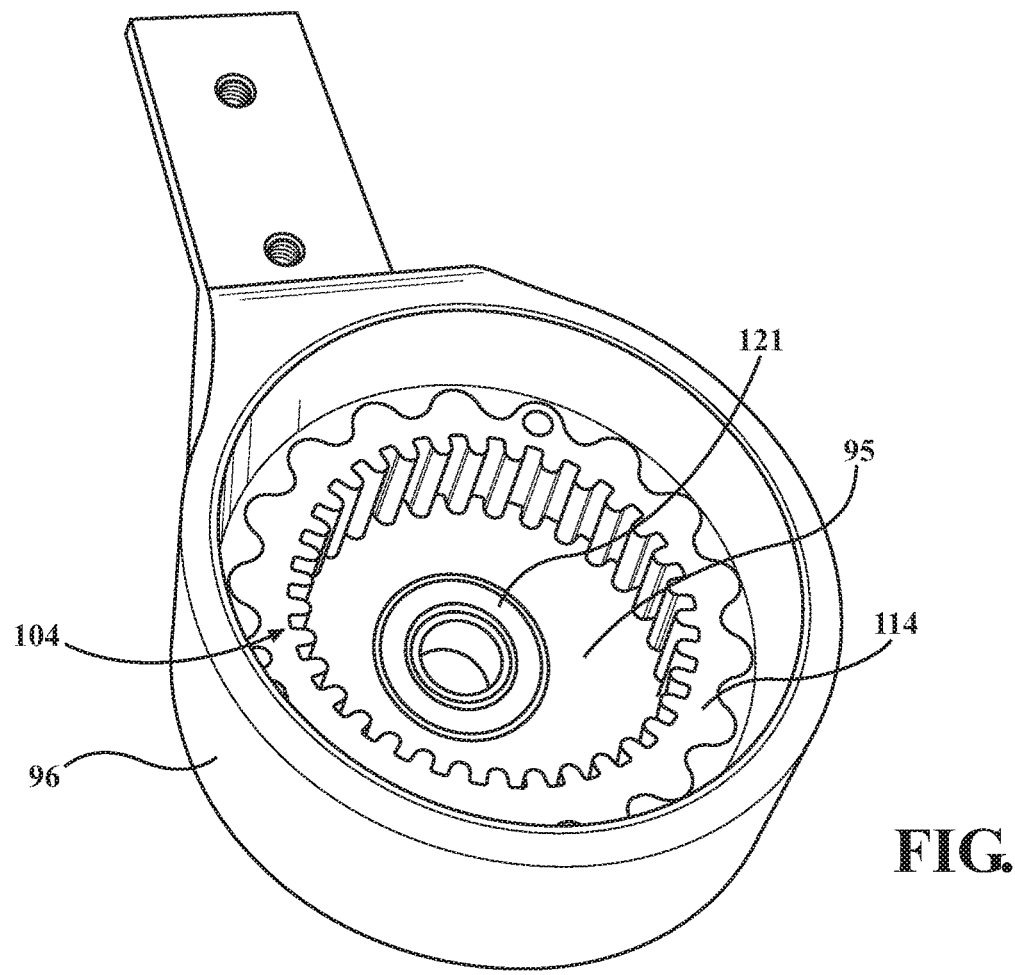
FIG. 9 is an inside perspective view of the moving ring gear.

Referring to FIG. 7, the actuator 78 comprises a gear assembly having an input member 102, an output member 104 connected to the movable member 86, and a gear arrangement 106 operable between the input member 102 and the output member 104. The motor 92 (not shown in FIG. 7) is coupled to the input member 102 to rotate the input member 102 and provides power for the actuator 78. Power from the motor 92 translates to torque that is transmitted to the input member 102 and through the gear arrangement 106, and results in rotation of the output member 104 to drive movement of the movable member 86. The motor 92 can be mounted to a component of the gear assembly, a housing of the actuator 78, the movable member 86, or any other suitable location on the patient support apparatus 50.

The input member 102, output member 104, and gear arrangement 106 collectively form a multi-stage cycloidal gear train. In other embodiments, a single-stage cycloidal gear train is utilized. One advantage of the cycloidal gear train (single or multi-stage) is the relatively small size compared to conventional linear actuators or similar devices. One advantage of multi-stage cycloidal gear trains that have an even number of stages is that the input member 102 and the output member 104 rotate concentrically about the center axis C1, without relative eccentric motion between the input member 102 and the output member 104. The embodiment shown is a two-stage cycloidal gear train.

The input member 102 comprises an eccentric drive member 112 eccentrically rotatable about the center axis C1. The eccentric drive member 112 is coupled to a drive shaft 111 driven about the center axis C1 by the motor 92. The eccentric drive member 112 may be coupled to the drive shaft 111 or integrally formed with the drive shaft 111 to be driven by the motor 92. The eccentric drive member 112 is generally cylindrically shaped, but other shapes are contemplated.

In the embodiment shown, the drive shaft 111 has a first portion 113 (see FIG. 5) that passes through the first end plate 94. The first portion 113 is rotatably secured in the first end plate 94 via a bearing 99. The first portion 113 terminates in a geometry shaped to engage the motor 92. The drive shaft 111 has a second portion 115 that extends from the first portion 113. The second portion 115 is hexagonally-shaped in cross-section to engage a corresponding hexagonally-shaped bore 117 in the eccentric drive member 112 in order to drive the eccentric drive member 112 with the drive shaft 111. Other shapes to provide this mating engagement are also possible. The eccentric drive member 112 is eccentric by virtue of the second portion 115 of the drive shaft 111 engaging the bore 117 in the eccentric drive member 112 about the center axis C1, which is spaced from a center axis E1 of the eccentric drive member 112. The drive shaft 111 further has a third portion 119 that extends from the second portion 115. The third portion 119 has a generally cylindrical shape. The third portion 119 is secured for rotation in the second end plate 95 about the center axis C1 (see FIG. 6) via a bearing 121.

The output member 104 comprises a ring gear, hereinafter referred to as a moving ring gear 114 rotatable about the center axis C1. The moving ring gear 114 is shown fixed internally inside the hub 96. The moving ring gear 114 may be a separate component fixed to the hub 96 and/or the arm 93 or may be integrally formed with the hub 96 and/or the arm 93. In the embodiment shown, the moving ring gear 114 is a separate component that is fixed to the hub 96 via fasteners (not shown).

Referring to FIGS. 7-11, the gear arrangement 106 comprises another ring gear, hereinafter referred to as a fixed ring gear 116 disposed about the center axis C1. The fixed ring gear 116 is shown fixed to the first end plate 94. In some embodiments, the fixed ring gear 116 is a separate component mounted to the first end plate 94 or integrally formed with the first end plate 94. In the embodiment shown, the fixed ring gear 116 is integrally formed with the first end plate 94. The fixed ring gear 116 is fixed about the center axis C1 and the moving ring gear 114 rotates relative to the fixed ring gear 116 about the center axis C1.

The fixed ring gear 116 is fixed with respect to the bracket 91. The movable member 86 is coupled to the moving ring gear 114 to move in response to movement of the moving ring gear 114. In the embodiment shown, the moving ring gear 114 is coupled to the movable member 86 by virtue of the arm 93, which is fixed relative to the moving ring gear 114. In this manner, the actuator 78 accommodates movement of the movable member 86 about the center axis C1. In other embodiments, the moving ring gear 114 may be integral with the movable member 86 or may be otherwise attached to the movable member 86 in any other suitable manner.

In alternative embodiments, instead of the moving ring gear 114 being connected to the movable member 86, another part of the gear assembly could be connected to the movable member 86 to move the movable member 86. In this case, the other part would be considered the output member, as the output member comprises the part of the actuator 78 that is connected to the movable member 86. For instance, the moving ring gear 114, instead of being connected to the movable member 86, could be fixed to the seat section 80 and the fixed ring gear 116 could be connected to the movable member 86 to move the movable member 86 (e.g., making the fixed ring gear 116 the output member 104).

The gear arrangement 106 further comprises a cycloidal drive 118 disposed in direct meshing relationship with each of the moving ring gear 114 and the fixed ring gear 116. The cycloidal drive 118 comprises a first cycloidal gear 122 and a second cycloidal gear 124. The cycloidal gears 122, 124 may be formed separately and mounted together or may be integrally formed as one piece. The fixed ring gear 116 and the first cycloidal gear 122 form a first stage of the gear train, while the second cycloidal gear 124 and moving ring gear 114 form a second stage of the gear train.

Figure 11:
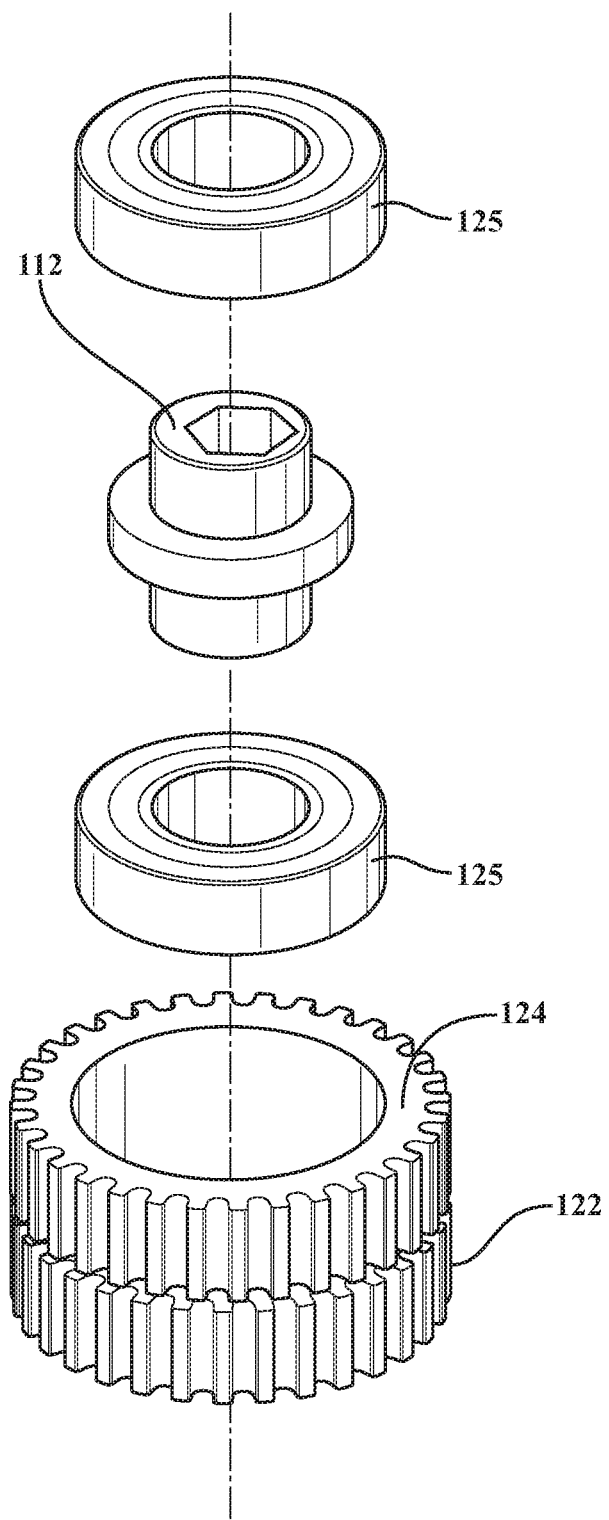
FIG. 11 is an exploded perspective view of the first and second cycloidal gears and an eccentric drive member.

The eccentric drive member 112 is supported for rotation inside of the cycloidal gears 122, 124 via one or more bearings 125. Two bearings 125 are shown in FIG. 11 to rotatably support the cycloidal gears 122, 124 on the eccentric drive member 112. As a result, the cyloidal gears 122, 124 are able to be driven by the eccentric drive member 112 in a cycloidal pattern of motion within their respective ring gears 114, 116. More specifically, the first cycloidal gear 122 is driven by the eccentric drive member 112 in a cycloidal pattern of motion via the meshing engagement of the first cycloidal gear 122 with the fixed ring gear 116 and the second cycloidal gear 124 is driven by the eccentric drive member 112 in a cycloidal pattern of motion via the meshing engagement of the second cycloidal gear 124 with the moving ring gear 114. The first cycloidal gear 122 is shown axially spaced from the second cycloidal gear 124, but in other embodiments the cycloidal gears 122, 124 may axially abut one another.

The first cycloidal gear 122 has a physical configuration different from the second cycloidal gear 124. The difference in configuration may be attributed to one of tooth geometry, gear diameter, number of teeth, profile shift, extended/reduced addendums or dedendums, tooth depth, trichoid design, tooth alignment between gears, or any other physical quality a gear may have, or any combination thereof. In other embodiments, the first cycloidal gear 122 may have an identical configuration as the second cycloidal gear 124. In the embodiment shown, the first cycloidal gear 122 has a different number of teeth than the second cycloidal gear 124, as described further below.

During operation, the moving ring gear 114 is constrained from radial movement with respect to the center axis C1 in order to effectuate the cycloidal motion of the second cycloidal gear 124 in the moving ring gear 114. In order to limit such radial motion, the hub 96 in which the moving ring gear 114 is fixed, is constrained so that the hub 96 rotates about the fixed ring gear 116 and the center axis C1 via a bearing assembly. The bearing assembly comprises a bushing 132 placed between the hub 96 and the fixed ring gear 116. The bearing assembly also comprises needle roller bearings 134 located between the fixed ring gear 116 and the bushing 132. Thus, the bearing assembly enables smooth rotation of the hub 96 about the fixed ring gear 116. It should be appreciated that the moving ring gear 114 could be rotationally journaled in any other manner to constrain radial motion or, in some cases, radial motion may be desirable.

Figure 12A:
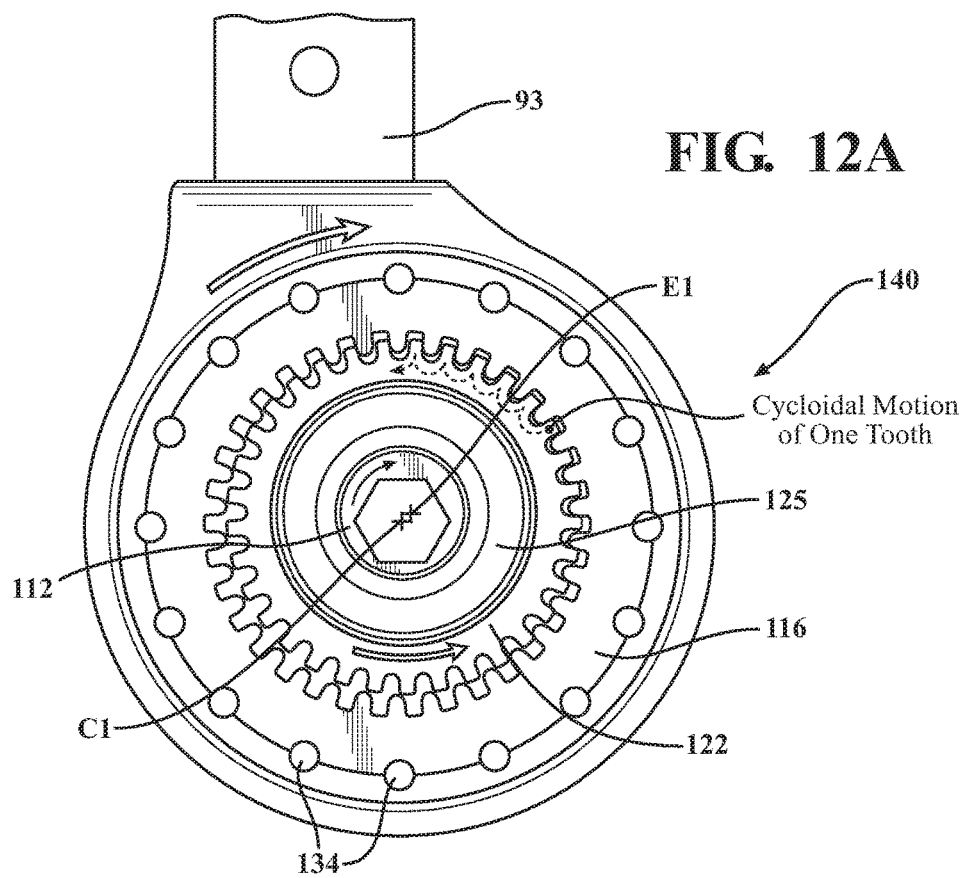
FIGS. 12A and 12B show elevational views of the first cycloidal gear moving in the fixed ring gear.
Figure 12B:
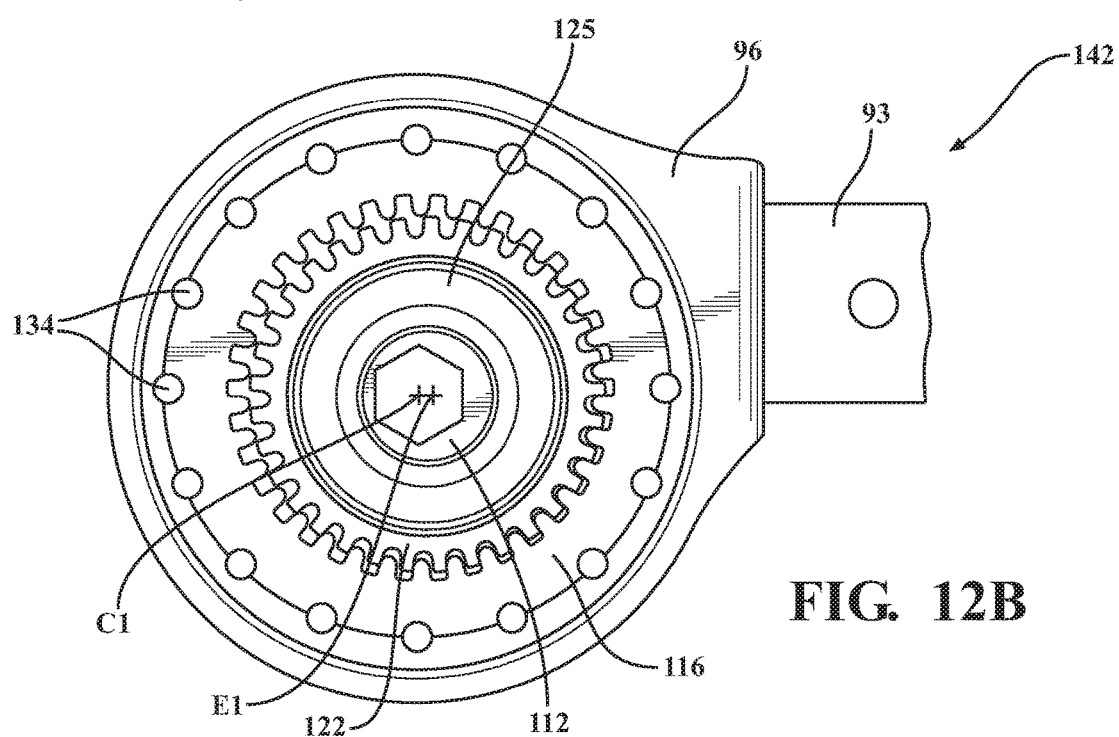

FIGS. 12A and 12B illustrate the cycloidal motion of the first cycloidal gear 122 within the fixed ring gear 116 during operation. As shown, the first cycloidal gear 122 comprises a number of teeth, referenced as $N_{FC}$. The fixed ring gear 116 comprises a number of teeth, referenced as $N_{FR}$. Each of the teeth of the fixed ring gear 116 are equally spaced from the center axis C1 so that the teeth are collectively concentric with the drive shaft 111. The first cycloidal gear 122 is sized so that only a portion of the teeth of the first cycloidal gear 122 engage the teeth of the fixed ring gear 116 during the cycloidal motion—in essence, the teeth of the first cycloidal gear 122 only partially mesh with the teeth of the fixed ring gear 116.

Figure 13A:
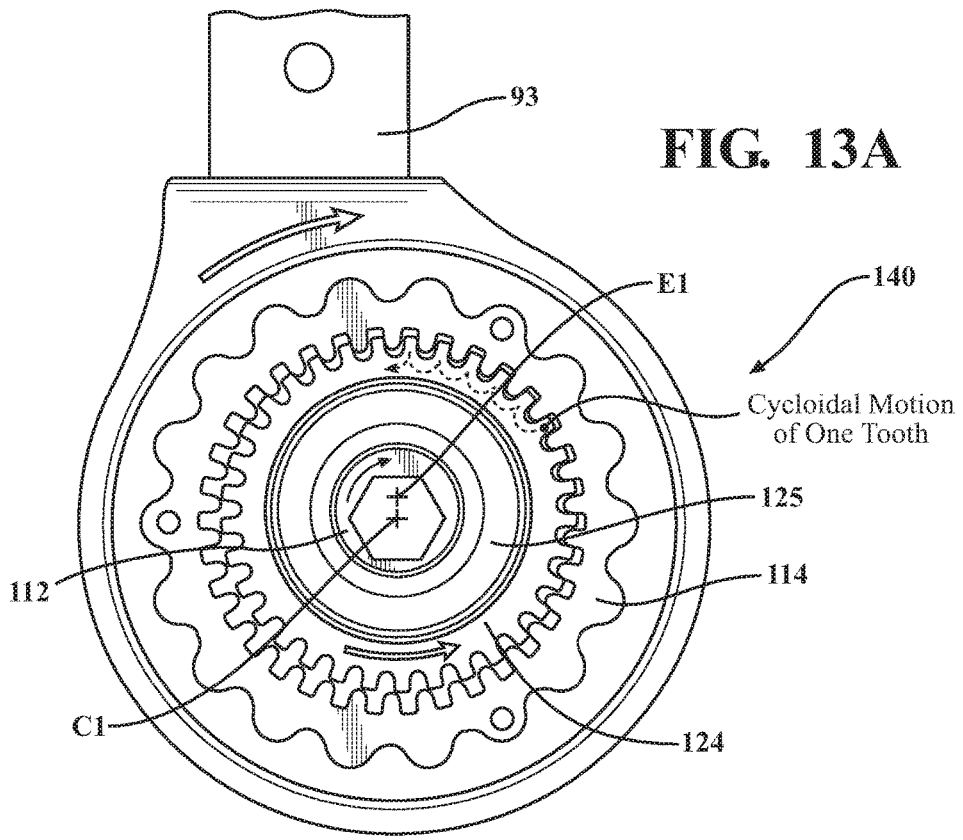
FIGS. 13A and 13B show elevational views of the second cycloidal gear in meshing relationship with the moving ring gear to move the moving ring gear.
Figure 13B:
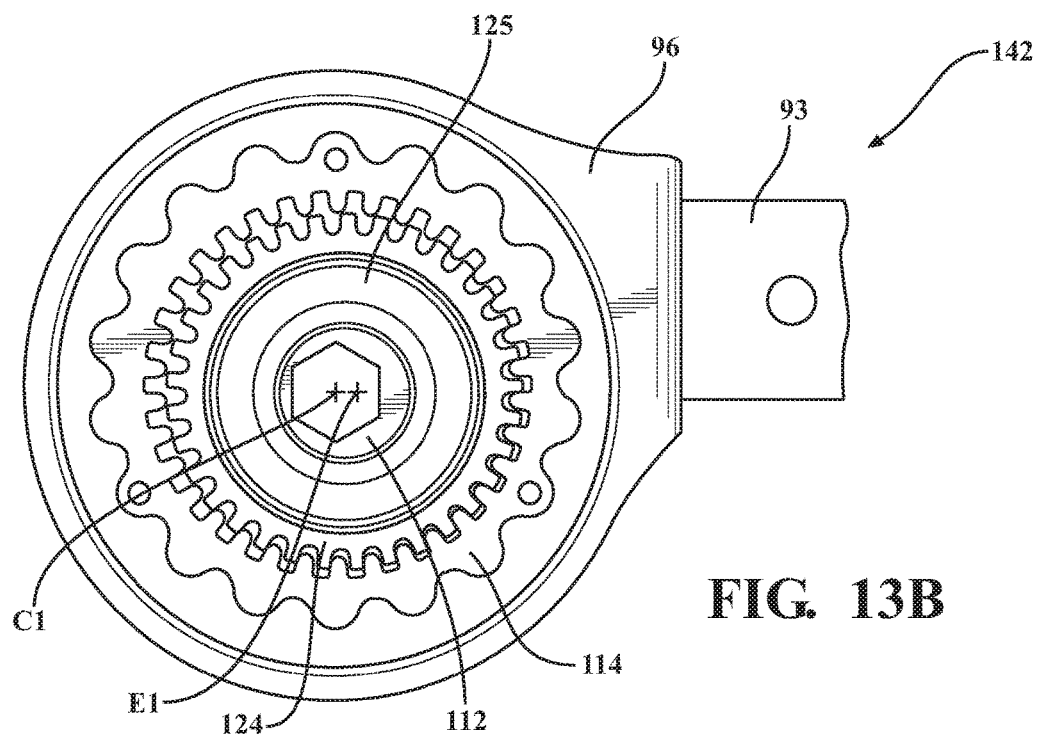

FIGS. 13A and 13B illustrate the cycloidal motion of the second cycloidal gear 124 within the moving ring gear 114 during operation. As shown, the second cycloidal gear 124 comprises a number of teeth, referenced as $N_{SC}$. The moving ring gear 114 comprises a number of teeth, referenced as $N_{MR}$. The second cycloidal gear 124 is sized so that only a portion of the teeth of the second cycloidal gear 124 engage the teeth of the moving ring gear 114 during the cycloidal motion—in essence, the teeth of the second cycloidal gear 124 only partially mesh with the teeth of the moving ring gear 114. Owing to the even number of stages in the embodiment of the cycloidal gear train shown, each of the teeth of the moving ring gear 114 are, like the fixed ring gear 116, equally spaced from the center axis C1 and are collectively concentric with the drive shaft 111. In other embodiments, the distance between the teeth of the moving gear 114 and the center axis C1 may vary by virtue of cycloidal motion of the moving ring gear 114.

In the embodiment shown, $N_{FC}$ equals 33, $N_{FC}$ equals 34, $N_{FR}$ equals 32, and $N_{MR}$ equals 33. Thus, the fixed ring gear 116 has more teeth than the moving ring gear 114, e.g., one more. In some embodiments, the fixed ring gear 116 has two more teeth than the moving ring gear 114, three more teeth than the moving ring gear 114, and so on. In yet other embodiments, the fixed ring gear 116 has less teeth than the moving ring gear 114, e.g., one less, two less, etc. In some cases, the fixed ring gear 116 and the moving ring gear 114 have the same number of teeth, such as when the first cycloidal gear 122 has a different number of teeth than the second cycloidal gear 124.

The number of teeth selected for the ring gears 114, 116 and the cycloidal gears 122, 124 may be based on the particular application in which the actuator 78 is being employed. In some cases, a high gear ratio may be desired. In other cases, a low gear ratio may be desired. In the embodiment shown, the two-stage cycloidal gear train has a gear ratio of 1089:1, but other ratios are possible in other embodiments. The ratios of the separate stages of the actuator 78, e.g., $N_{FR}/N_{FC}$ and $N_{SC}/N_{MR}$, may be different or the same. On the other hand, a first ratio of $N_{FR}/N_{FC}$ is different from a second ratio of $N_{MR}/N_{SC}$ to enable movement of the moving ring gear 114 relative to the fixed ring gear 116.

During operation, the motor 92 is configured to rotate the drive shaft 111 about the center axis C1, which eccentrically rotates the eccentric drive member 112 about the center axis C1, thereby imparting cycloidal motion to the first cycloidal gear 122 by virtue of the partial meshing engagement of the first cycloidal gear 122 to the fixed ring gear 116 and imparting cycloidal motion to the second cycloidal gear 124 by virtue of the partial meshing engagement of the second cycloidal gear 124 to the moving ring gear 114, which rotates the moving ring gear 114 relative to the fixed ring gear 116 about the center axis C1 and moves the movable member 86. This configuration is referred to as forward drive and the gear assembly is forward driven.

As shown in FIGS. 12A, 12B and 13A, 13B, a progression of the cycloidal gear train using forward drive is illustrated. Clockwise and counter-clockwise directions are relative directions and refer to rotation of individual components of the cycloidal gear train with respect to the views shown in FIGS. 12A, 12B and 13A, 13B. A first state 140 of the cycloidal gear train is shown in FIGS. 12A and 13A. A second state 142 of the cycloidal gear train is shown in FIGS. 13A and 13B.

The gear assembly (see FIG. 7) is back driven when a load is applied externally to the movable member 86, which creates torque in opposition to the forward driving torque that, if not checked, would otherwise rotate the moving ring gear 114 in an opposite direction to its forward driving direction and reverse the cycloidal motion of the cycloidal gears 122, 124, thereby causing reverse rotation of the eccentric drive member 112 about the center axis C1.

The gear assembly has a forward drive efficiency and a back drive efficiency. The forward drive efficiency defines a proportion of forward drive output power to forward drive input power when the forward drive input power is applied to the input member 102 (e.g., the eccentric drive member 112) by the motor 92 and the forward drive output power is available at the output member 104 (e.g., the moving ring gear 114) in response to the forward drive input power.

The back drive efficiency defines a proportion of back drive output power to back drive input power wherein the back drive input power (e.g., the torque caused by the external load) is applied to the output member 104 and the back drive output power is available at the input member 102 in response to the back drive input power. Generally, lower forward drive efficiency results in lower back drive efficiency.

In this embodiment, the forward drive efficiency is greater than the back drive efficiency. For example, in the embodiment shown, the forward drive efficiency is 0.5 or less and the back drive efficiency is 0.0 or less. When this occurs, the gear assembly may not be back driven. Said differently, when the back drive efficiency is 0.0 or less, the gear assembly does not permit rotation of the moving ring gear 114 in either direction unless forward driven. The cycloidal gear train may be designed to have gear losses such that the forward drive efficiency is less than 0.5 and the back drive efficiency is less than 0.0.

Providing the gear assembly with back drive efficiency of 0.0 or less has many advantages. One advantage is regardless of power applied to the output member 104 (e.g., torque caused by the external loads), the input member 102 will not rotate in response. This advantage is particularly beneficial for patient support apparatus applications. Returning to the embodiment of FIGS. 2 and 3 as an example, movement of the fowler section 82 is entirely dependent on power being supplied to the motor 92 rather than as a result of a load being applied to the fowler section 82 such as via weight of a patient on the fowler section 82 or the fowler section 82 being manipulated by a patient. As another example, in the event the patient support apparatus 50 is being transported and the fowler section 82 collides with an external object, the fowler section 82 would not move from the position the fowler section 82 was in prior to the collision. Other advantages include not requiring an external braking solution to be coupled to the cycloidal gear train or requiring the motor 92 to have an internal braking solution. Either of the external braking solution and the internal motor braking solution may be necessary in the event that the cycloidal gear train is back drivable. It should be appreciated that brakes could still be employed as a redundant safety mechanism.

As previously described, the patient support apparatus 50 may have numerous devices that comprise one or more movable members that need to be moved to perform a desired function. The actuator 78 described can be used to cause movement of such movable members. Although the actuator 78 could be used in many different types of devices present on the patient support apparatus 50, only a few, non-limiting, additional examples are illustrated for convenience.

Referring to FIGS. 14-17, the actuator 78 described above may be used for application in an alternative lift system 200. The actuator 78 is hereinafter referenced as actuator 210. The lift system 200 is coupled to a base 202 and an intermediate frame 204 and moves the intermediate frame 204 relative to the base 202 between a raised position, a lowered position, and one or more positions therebetween.

In the embodiment shown in FIG. 14, the lift system 200 comprises a head end lifting arm 206. The head end lifting arm 206 is pivotally coupled at one end to the intermediate frame 204 at joint 208. The head end lifting arm 206 is slidably coupled at an opposing end to the base 202. The lift system 200 further comprises a first timing arm 212. The first timing arm 212 is pivotally coupled at one end to the head end lifting arm 206 at joint 214. The first timing arm 212 is pivotally coupled at an opposing end to the base 202 at joint 216. The lift system 200 additionally comprises a foot end lifting arm 218 pivotally coupled at one end to the intermediate frame 204 at joint 220. The foot end lifting arm 218 is slidably coupled at an opposing end to the base 202 (see FIG. 15 showing gear riding along rack when foot end lifting arm 218 slides in slot relative to base 202). The lift system 200 further comprises a second timing arm 222. The second timing arm 222 is pivotally coupled to the foot end lifting arm 218 at joint 224. The second timing arm 222 is pivotally coupled to the base 202 at joint 226. It should be appreciated that although reference is made to only a single head end lifting arm 206, a single foot end lifting arm 218, a single first timing arm 212, and a single second timing arm 222, multiples of such arms could also be employed.

In this embodiment, two actuators 210 are utilized for raising and lowering the intermediate frame 204 relative to the base 202. More specifically, one actuator 210 is coupled to one of the joints 208, 214, 216 associated with the head end and another actuator 210 is coupled to one of the joints 220, 224, 226 associated with the foot end. In other embodiments, more than two actuators 210 can be utilized.

In another embodiment, one actuator 210 is coupled to the joint 208 associated with the head end and another actuator 210 is coupled to the joint 220 associated with the foot end. The head end lifting arm 206 is a movable member and the actuator 210 coupled to the joint 208 drives movement of the head end lifting arm 206 relative to the intermediate frame 204. The foot end lifting arm 218 is another movable member and the actuator 210 coupled to the joint 220 drives movement of the foot end lifting arm 218 relative to the intermediate frame 204. The actuators 210 operate in concert to raise and lower the intermediate frame 204 relative to the base 202 so that the intermediate frame 204 remains horizontal and parallel with a floor surface. In an alternative embodiment, one of the actuators 210 may drive movement of one of the movable members to raise and lower either the head end or the foot end such that the intermediate frame 204 does not remain horizontal with the floor surface. In further embodiments, the actuators 210 can be driven at different speeds to provide Trendelenburg or reverse Trendelenburg movement.

Figure 16:
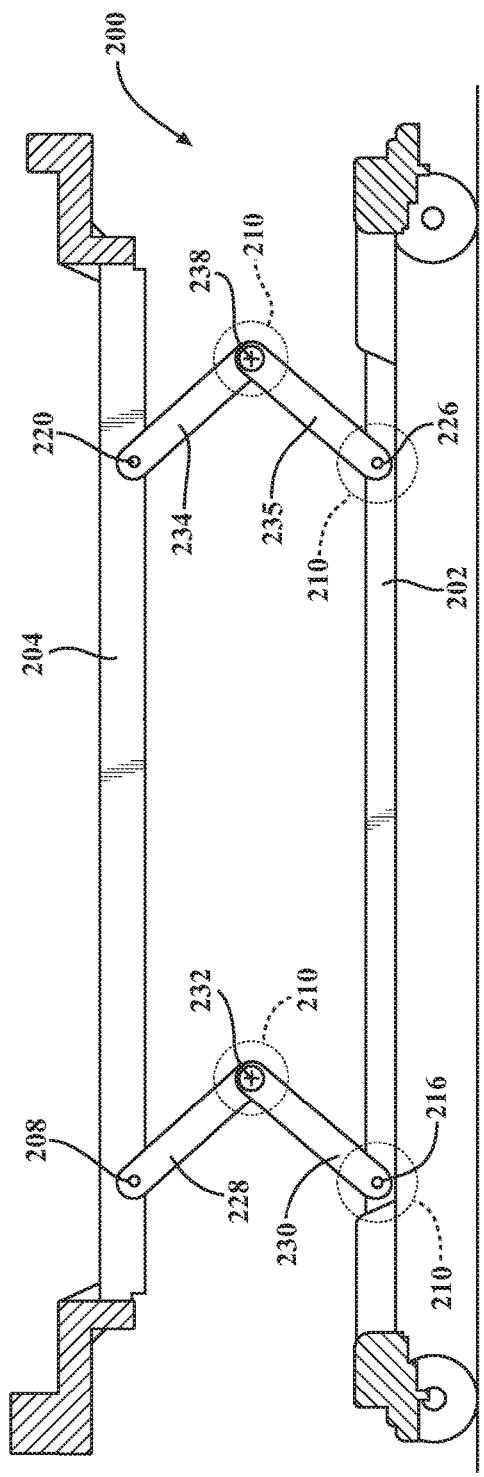
FIG. 16 is an elevational view illustrating one embodiment of where the actuator may be coupled.

In another embodiment shown in FIG. 16, the lift system 200 comprises a head end upper arm 228 pivotally coupled to the intermediate frame 204 at joint 208 and a head end lower arm 230 pivotally coupled to the base 202 at joint 216. The head end upper arm 228 is pivotally coupled to the head end lower arm 230 at joint 232. The lift system 200 further comprises a foot end upper arm 234 pivotally coupled to the intermediate frame 204 at joint 220 and a foot end lower arm 235 pivotally coupled to the base 202 at joint 226. The foot end upper arm 234 is pivotally coupled to the foot end lower arm 235 at joint 238. In some versions, one of the head end upper 228 and lower 230 arms and one of the foot end upper 234 and lower 235 arms are fixed in place, e.g., do not pivot relative to the intermediate frame 204 or the base 202. It should be appreciated that although reference is made to only a single head end upper arm 228, a single head end lower arm 230, a single foot end upper arm 234, and a single foot end lower arm 235, multiples of such arms could also be employed.

Both of the head end upper 228 and lower 230 arms are movable members and both of the foot end upper 234 and lower 235 arms are movable members. The actuator 210 coupled to the joint 232 drives movement of the head end upper 228 and lower 230 arms relative to each other. The actuator 210 coupled to the joint 238 drives movement of the foot end upper 234 and lower 235 arms relative to each other. The actuator 210 coupled to the joint 216 drives movement of the head end lower arm 230 relative to the base 202. The actuator 210 coupled to the joint 226 drives movement of the foot end lower arm 235 relative to the base 202. The actuators 210 coupled to the joints 216, 226, 232, 238 operate in concert to raise and lower the intermediate frame 204 relative to the base 202. In an alternative embodiment, one of the actuators 210 may drive movement of one of the movable members to raise and lower either the head end or the foot end such that the intermediate frame 204 does not remain horizontal with the floor surface. In further embodiments, the actuators 210 can be driven at different speeds to provide Trendelenburg or reverse Trendelenburg movement. Further, additional actuators 210 may be present at one or more of the joints 208, 220.

Figure 17:
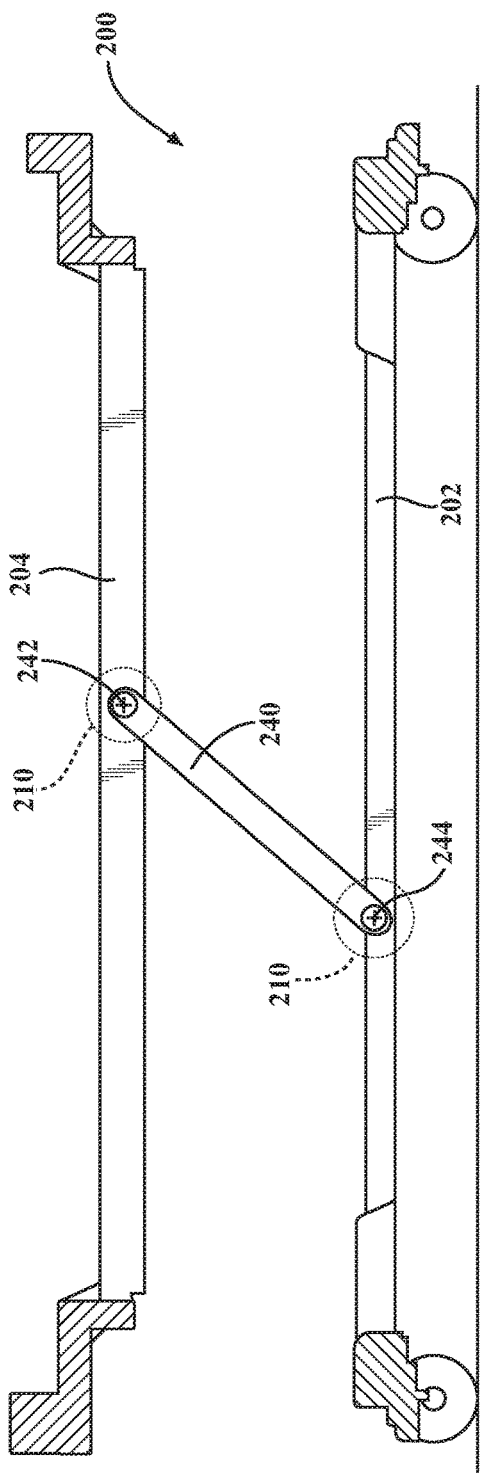
FIG. 17 is an elevational view illustrating another embodiment of where the actuator may be coupled.

In another embodiment shown in FIG. 17, the lift system 200 comprises a center lifting arm 240 pivotally coupled to the intermediate frame 204 at joint 242 and pivotally coupled to the base 202 at joint 244. It should be appreciated that although reference is made to only a single center lifting arm 240 multiple center lifting arms 240 could also be employed. In this embodiment, two actuators 210 are utilized for raising and lowering the intermediate frame 204 relative to the base 202. More specifically, one actuator 210 is coupled to the joint 242 and another actuator 210 is coupled to the joint 244. The center lifting arm 240 is a movable member for both actuators 210 and the intermediate frame 204 is a movable member for the actuator 210 at the top joint 242 (to control Trendelenburg and reverse Trendelenburg positioning). The actuators 210 drive movement of the center lifting arm 240 relative to the intermediate frame 204 and base 202 and work in concert to raise and lower the intermediate frame 204 relative to the base 202. Alternatively, one of the actuators 210 may drive movement, while the other actuator 210 remains stationary to raise and lower either the head end or the foot end such that the intermediate frame 204 does not remain horizontal with the floor surface. In further embodiments, the actuators 210 can be driven at different speeds to provide Trendelenburg or reverse Trendelenburg movement.

Figure 18:
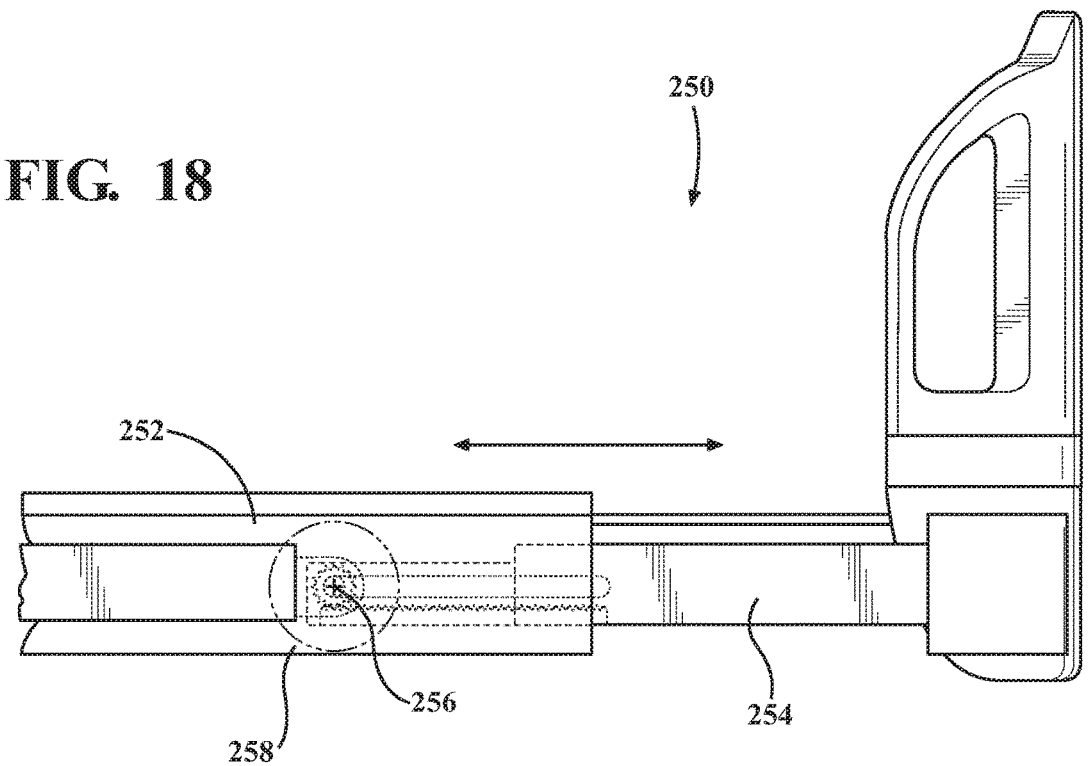
FIG. 18 is an elevational view illustrating the actuator coupled to a bed length extension device.

In another embodiment shown in FIG. 18, the actuator 78 described above may be used for application in a bed length extension device 250. The actuator 78 is hereinafter referenced as actuator 258. The bed length extension device 250 comprises a support frame 252 coupled to an extending member 254 at sliding joint 256. The bed length extension device 250 adjusts a length of the patient support apparatus 50 to accommodate patients of greater than average height. The actuator 258 is coupled to the support frame 252 and the extending member 254 and drives movement of the extending member 254 relative to the support frame 252 e.g., by driving a gear that slides a toothed rack fixed to the extending member 254. Thus, moving the extending member 254 away from the support frame 252 to lengthen the patient support apparatus 50.

Figure 19:
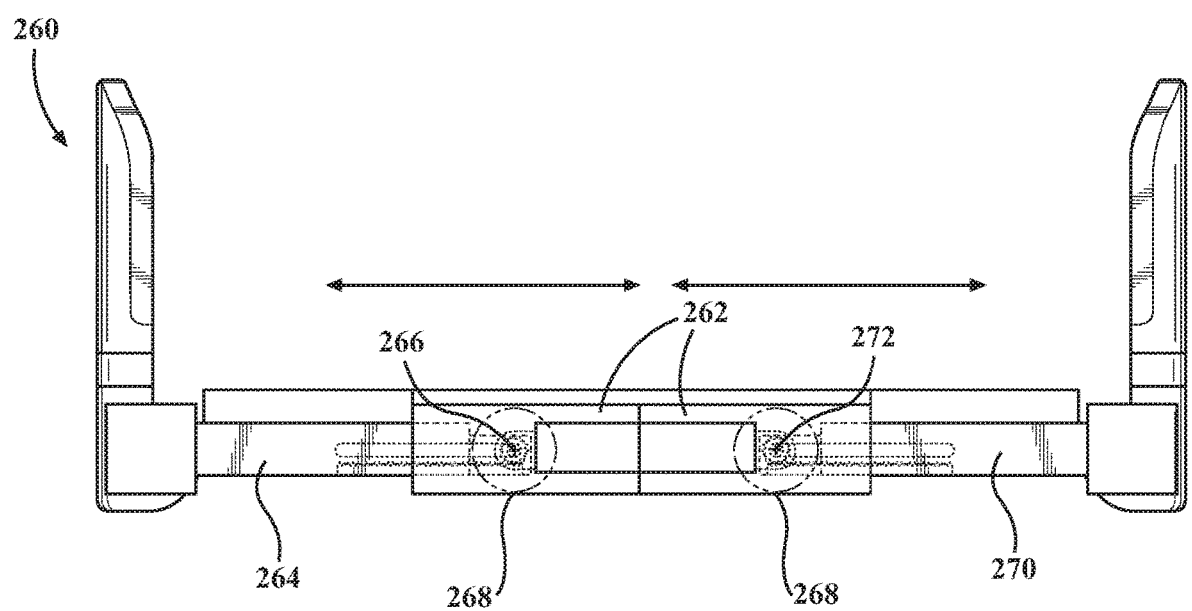
FIG. 19 is an elevational view illustrating the actuator coupled to a bed width extension device.
Figure 20:
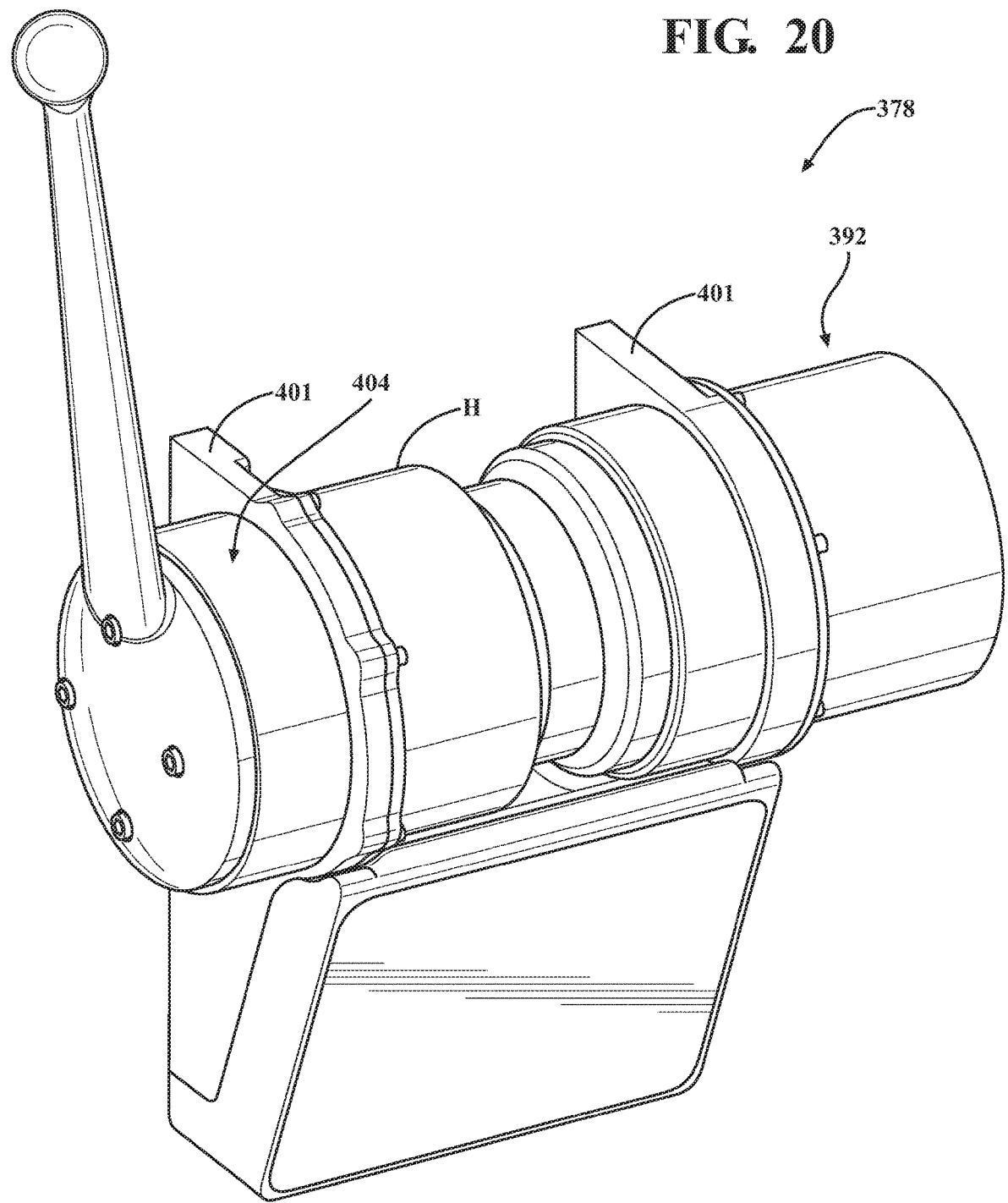
FIG. 20 is a perspective view of an alternative actuator.

In another embodiment shown in FIG. 19, the actuator 78 described above may be used for application in a bed width extension device 260. The actuator 78 is hereinafter referenced as actuator 268. The bed width extension device 260 comprises a support frame 262 coupled to a first extending member 264 at sliding joint 266. The bed width extension device 260 further comprises a second extending member 270 coupled to the support frame 262 at sliding joint 272. The bed width extension device 260 adjusts a width of the patient support apparatus 50 to accommodate patients of greater than average width. One actuator 268 is coupled to the sliding joint 266 and drives movement of the first extending member 264 relative to the support frame 262 (e.g., by driving a first gear that slides a first toothed rack fixed to the first extending member 264). Another actuator 268 is coupled to the sliding joint 272 and drives movement of the second extending member 270 relative to the support frame 262 (e.g., by driving a second gear that slides a second toothed rack fixed to the second extending member 270). The first 264 and second 270 extending members move away from the support frame 262 to widen the patient support apparatus 50. In one embodiment, only one of the actuators 268 drives movement of one of the extending members 264, 270 away from the support frame 262.

In other embodiments, not shown, the actuator 78 described above may be used anywhere in the patient support apparatus 50 including driving wheels, side rails, footboard, headboard, or any other movable component of the patient support apparatus 50. The gears and other components of the actuator 78 could be formed of metal, plastic, other suitable materials, or combinations thereof. Likewise, the movable members 86 could be formed of metal, plastic, other suitable materials, or combinations thereof.

Referring to FIGS. 20-24, an alternative embodiment of the actuator 78 is shown at 378. The actuator 378 comprises a gear assembly having an input member 402, an output member 404 connected to the movable member 86, and a gear arrangement 406 operable between the input member 402 and the output member 404. The actuator 378 operates in much the same manner as the actuator 78. The input member 402, output member 404, and gear arrangement 406 collectively form a multi-stage cycloidal gear train.

Motor 392 is coupled to the input member 402 to rotate the input member 402 and provides power for the actuator 378. Power from the motor 392 translates to torque that is transmitted to the input member 402 and through the gear arrangement 406, and results in rotation of the output member 404 to drive movement of the movable member 86. The motor 392 can be mounted to a component of the gear assembly, a housing H of the actuator 378, the movable member 86, or any other suitable location on the patient support apparatus 50. In this embodiment, the motor 392 is mounted to one of a pair of brackets 401 fastened to the housing H. The brackets 401 and housing H can be mounted to any part of the patient support apparatus 50 to cause movement of the movable member 86.

The motor 392 has a drive shaft connected to a sun gear 393 to rotate the sun gear 393 about a center axis C2 of the actuator 378. The sun gear 393 is meshed with and drives a set of planet gears 395 to revolve the planet gears 395 around the center axis C2. The planet gears 395 are meshed with a planetary ring gear 397. In this embodiment, three planet gears 395 are employed, but more or less are possible. The planet gears 395 are rotatably supported in a carrier 399 that rotates as the planet gears 395 revolve about the center axis C2 by virtue of the planetary ring gear 397 being fixed with respect to the brackets 401 and the housing H.

The input member 402 comprises an eccentric drive member 412 that forms part of the carrier 399 and which is eccentrically rotatable about the center axis C2. The eccentric drive member 412 is thus driven eccentrically about the center axis C2 by the motor 392. The output member 404 comprises a moving ring gear 414 rotatable about the center axis C2 inside the housing H (via ball bearings shown, but not numbered) and relative to the brackets 401. The moving ring gear 414 moves the movable member 86 through a connector hub 403. The connector hub 403 is connected to the moving ring gear 414 to rotate with the moving ring gear 414 about the center axis C2.

The gear arrangement 406 comprises another ring gear, hereinafter referred to as a fixed ring gear 416 disposed about the center axis C2. The fixed ring gear 416 is fixed with respect to the brackets 401 and, in the embodiment shown, comprises an integral part of the housing H. In some embodiments, the fixed ring gear 416 is a separate component. The fixed ring gear 416 is fixed about the center axis C2 and the moving ring gear 414 rotates relative to the fixed ring gear 416 about the center axis C2.

The gear arrangement 406 further comprises a cycloidal drive 418 disposed in direct meshing relationship with each of the moving ring gear 414 and the fixed ring gear 416. The cycloidal drive 418 comprises a first cycloidal gear 422 and a second cycloidal gear 424. The cycloidal gears 422, 424 may be formed separately and mounted together or may be integrally formed as one piece. The fixed ring gear 416 and the first cycloidal gear 422 form a first stage of the gear train, while the second cycloidal gear 424 and moving ring gear 414 form a second stage of the gear train.

Figure 21:
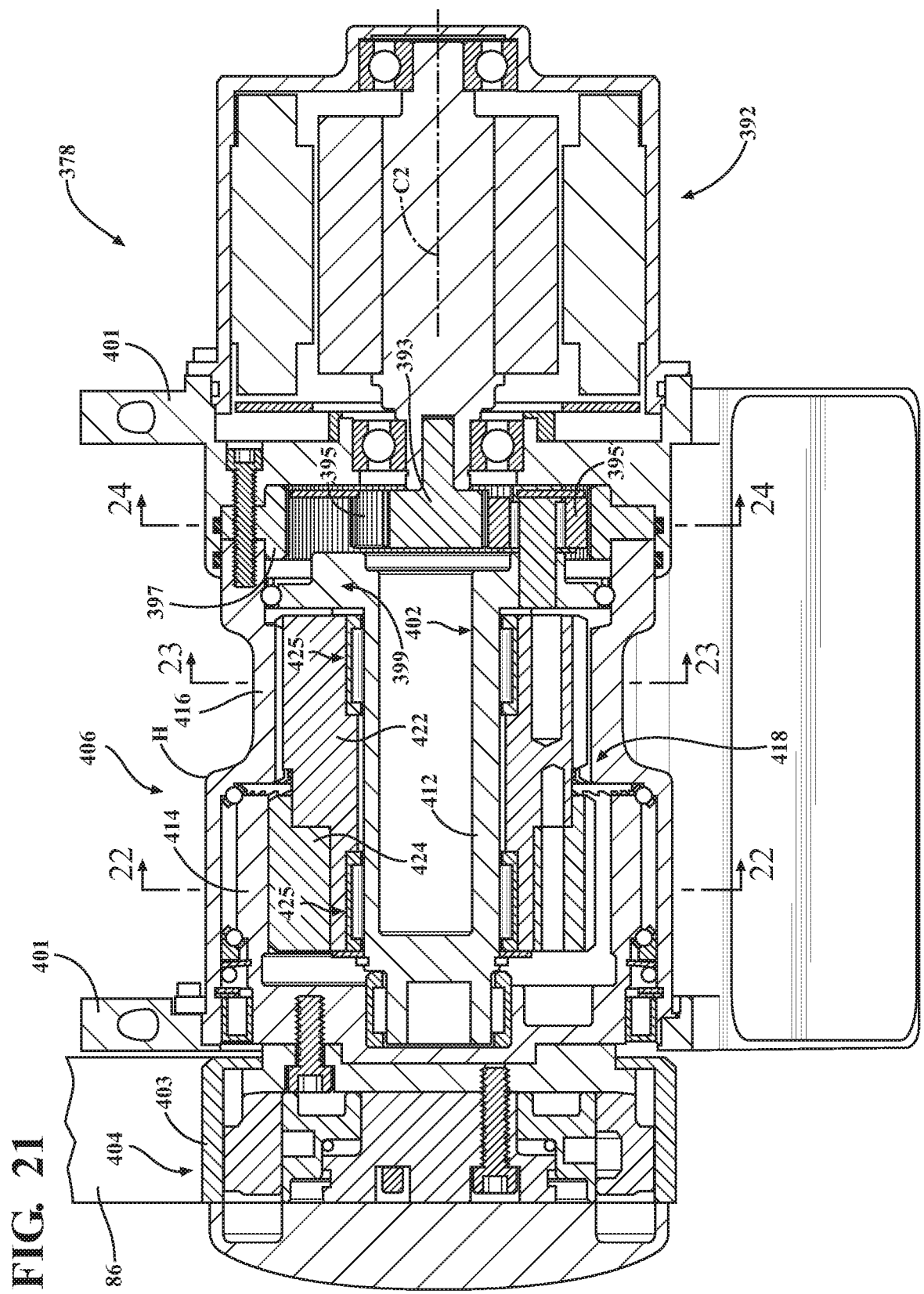
FIGS. 21-24 are cross-sectional views of the actuator of FIG. 20.
Figure 22:
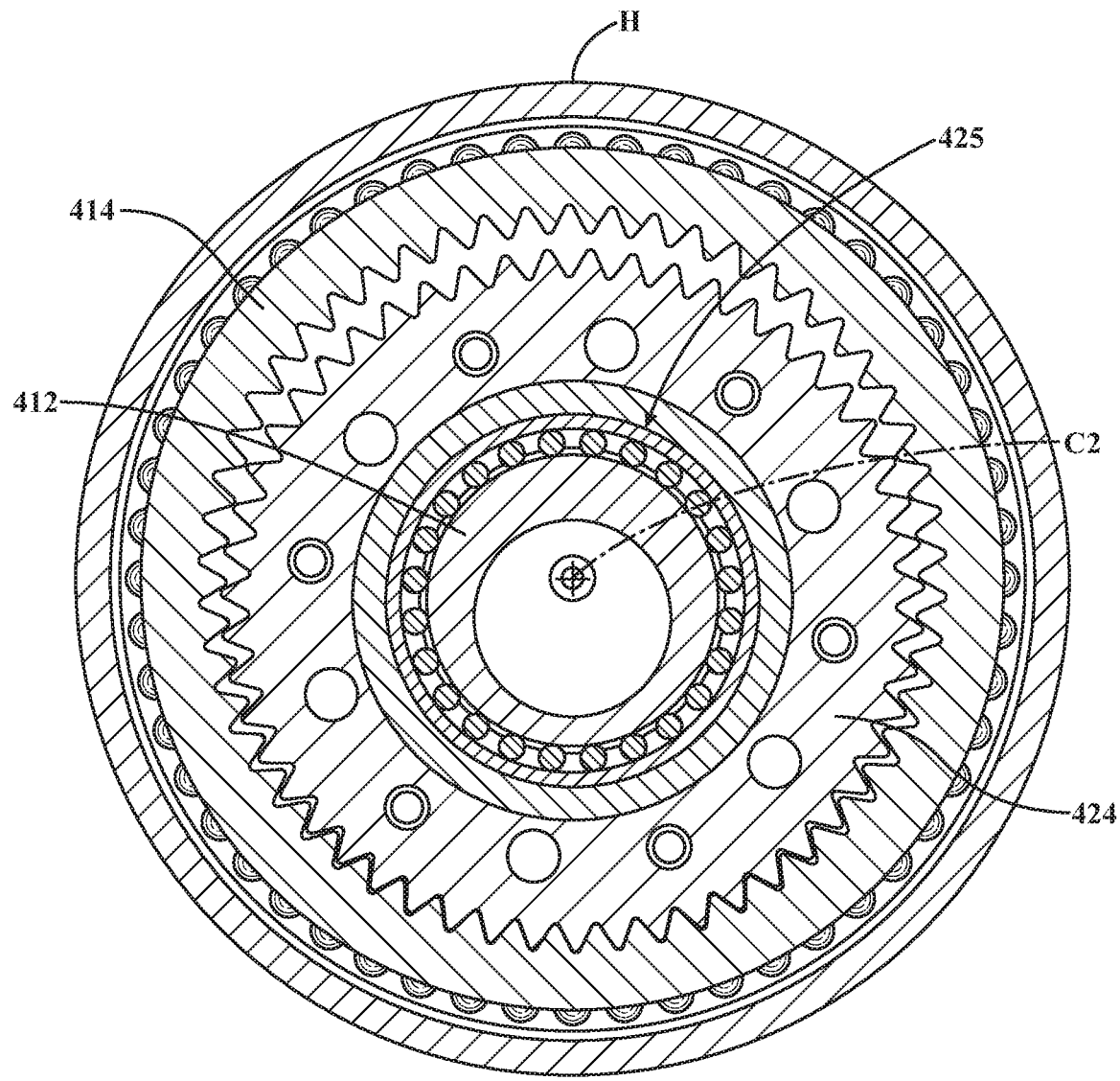
Figure 23:
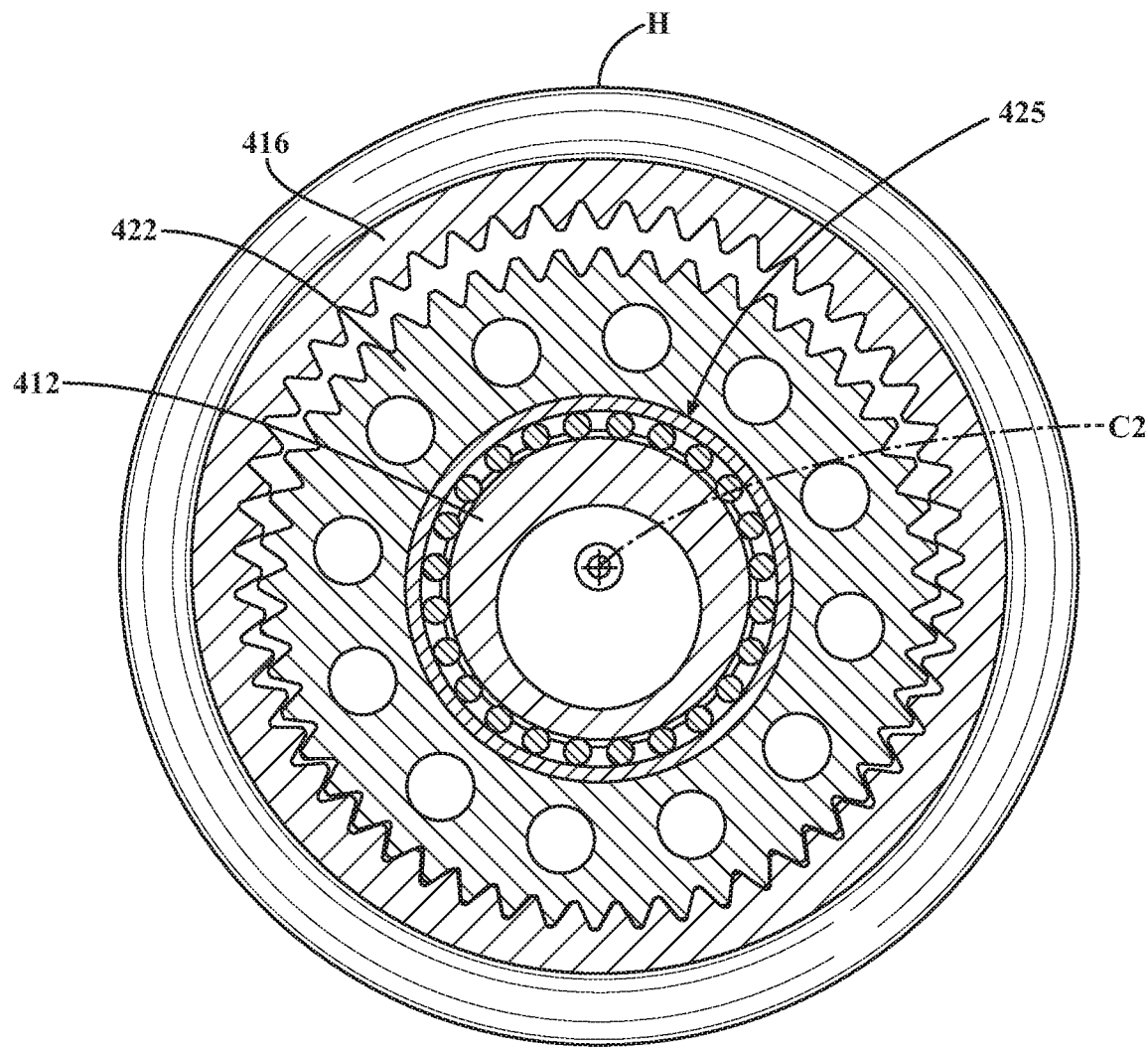
Figure 24:
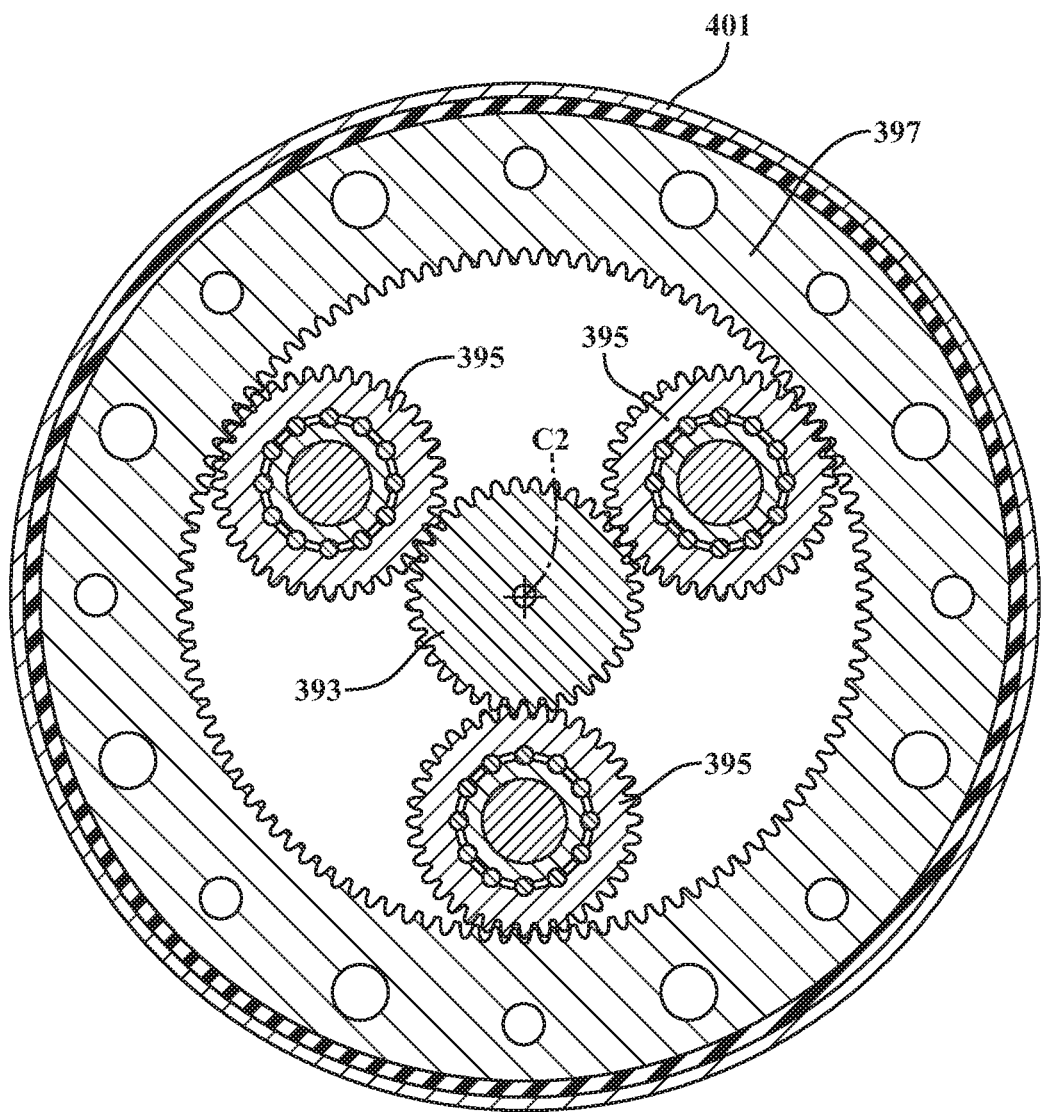

The eccentric drive member 412 is supported for rotation inside of the cycloidal gears 422, 424 via one or more bearings 425. Two bearings 425 are shown in FIG. 21 to rotatably support the cycloidal gears 422, 424 on the eccentric drive member 412. As a result, the cyloidal gears 422, 424 are able to be driven by the eccentric drive member 412 in a cycloidal pattern of motion within their respective ring gears 414, 416. More specifically, the first cycloidal gear 422 is driven by the eccentric drive member 412 in a cycloidal pattern of motion via the meshing engagement of the first cycloidal gear 422 with the fixed ring gear 416 and the second cycloidal gear 424 is driven by the eccentric drive member 412 in a cycloidal pattern of motion via the meshing engagement of the second cycloidal gear 424 with the moving ring gear 414. Operation of the actuator 378 is similar to the actuator 78.

The first cycloidal gear 422 has a physical configuration different from the second cycloidal gear 424. The difference in configuration may be attributed to one of tooth geometry, gear diameter, number of teeth, profile shift, extended/reduced addendums or dedendums, tooth depth, trichoid design, tooth alignment between gears, or any other physical quality a gear may have, or any combination thereof. In the embodiment shown, the first cycloidal gear 422 has a different number of teeth than the second cycloidal gear 424.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention claimed is:

1. A patient support apparatus comprising:
   a patient support surface;
   a first member and a movable member, said movable member movable relative to said first member; and
   an actuator coupled to said movable member to move said movable member relative to said first member to thereby move said patient support surface, said actuator comprising:
      a gear assembly having an input member, an output member connected to said movable member, and a gear arrangement operable between said input member and said output member; and
      a motor configured to apply torque to said input member to rotate said output member through said gear arrangement,
   said gear arrangement comprising a cycloidal drive arranged to drive said output member when said motor applies torque to said input member,
   wherein said gear assembly has a forward drive efficiency and a back drive efficiency, said forward drive efficiency being greater than said back drive efficiency, wherein said forward drive efficiency defines a proportion of forward drive output power to forward drive input power when said forward drive input power is applied to said input member by said motor and said forward drive output power is available at said output member in response to said forward drive input power, and said back drive efficiency defines a proportion of back drive output power to back drive input power wherein said back drive input power is applied to said output member and said back drive output power is available at said input member in response to said back drive input power; and
   wherein said gear assembly comprises a planetary ring gear, planet gears meshing with said planetary ring gear, and a carrier supporting said planet gears, wherein said input member comprises an eccentric drive member fixed to said carrier to rotate with said carrier.

2. The patient support apparatus of claim 1, wherein said input member, said output member, and said gear arrangement operable between said input member and said output member form a multi-stage cycloidal gear train.

3. The patient support apparatus of claim 2, wherein said multi-stage cycloidal gear train comprises an even number of stages such that both said input member and output member rotate about a center axis fixed relative to said motor.

4. The patient support apparatus of claim 3, wherein said input member comprises an eccentric drive member rotatable about said center axis, said output member comprises a moving ring gear rotatable about said center axis, and said gear arrangement comprises a fixed ring gear disposed about said center axis, wherein said cycloidal drive comprises a first cycloidal gear disposed in direct meshing relationship with said fixed ring gear and a second cycloidal gear disposed in direct meshing relationship with said moving ring gear.

5. The patient support apparatus of claim 4, wherein said first cycloidal gear is arranged to mesh with said fixed ring gear in a cycloidal pattern of motion and said second cycloidal gear is arranged to mesh with said moving ring gear in a cycloidal pattern of motion.

6. The patient support apparatus of claim 4, wherein said first cycloidal gear is fixed to said second cycloidal gear.

7. The patient support apparatus of claim 4, wherein said movable member is fixed to said moving ring gear to move with said moving ring gear, said moving ring gear comprising a plurality of moving teeth equally spaced from said center axis.

8. The patient support apparatus of claim 7, wherein said gear assembly comprises a carrier fixed relative to said center axis to rotatably support said eccentric drive member for eccentric rotation about said center axis, said fixed ring gear fixed to said carrier and comprising a plurality of fixed teeth equally spaced from said center axis.

9. The patient support apparatus of claim 4, wherein said motor is configured to rotate said eccentric drive member about said center axis, which eccentrically and cycloidally drives said first and second cycloidal gears about said center axis, which rotates said moving ring gear relative to said fixed ring gear about said center axis and moves said movable member relative to said first member.

10. The patient support apparatus of claim 9, wherein said first cycloidal gear comprises NFC number of teeth and said fixed ring gear comprises NFR number of teeth.

11. The patient support apparatus of claim 10, wherein said second cycloidal gear comprises NSC number of teeth and said moving ring gear comprises NMR number of teeth.

12. The patient support apparatus of claim 11 wherein NFR is different than NMR.

13. The patient support apparatus of claim 12, wherein NFR is greater than NMR.

14. The patient support apparatus of claim 11, wherein NFC is different than NSC.

15. The patient support apparatus of claim 14, wherein NFC is greater than NSC.

16. The patient support apparatus of claim 1, wherein said back drive efficiency is 0.0 or less and said forward drive efficiency is 0.5 or less.

17. The patient support apparatus of claim 1, wherein said movable member comprises one or more of a lift member, a patient support deck member, a bed length extension member, a bed width extension member, a wheel, a side rail, a footboard, or a headboard.

18. The patient support apparatus of claim 1, comprising a patient support deck having a base section and a movable section movable relative to said base section, wherein said actuator is mounted to said base section and said movable section comprises said movable member.

19. The patient support apparatus of claim 1, comprising a patient support deck having a seat section, a fowler section, and a foot section, wherein said actuator is mounted to said seat section, and one of said fowler section and said foot section comprises said movable member.

20. The patient support apparatus of claim 1, comprising a base, a support frame, a first lift member, and a second lift member movable relative to said first lift member to lift and lower said support frame relative to said base, wherein said actuator is mounted to one of said base, said support frame, said first lift member, and said second lift member.

\* \* \* \* \*